United States Patent [19]
Farabaugh

[11] 3,998,616
[45] Dec. 21, 1976

[54] MANUFACTURE OF FLAT GLASS HAVING CONTROLLED WIDTH AND NIP WIDTH

[75] Inventor: Aloysius W. Farabaugh, Verona, Pa.
[73] Assignee: PPG Industries, Inc., Pittsburgh, Pa.
[22] Filed: Feb. 3, 1975
[21] Appl. No.: 546,846

[52] U.S. Cl. ............................. 65/29; 65/65 A; 65/99 A; 65/182 R; 250/342; 65/160
[51] Int. Cl.² ................................. C03B 18/02
[58] Field of Search ............ 65/29, 65 A, 91, 99 A, 65/201, 200, 182 R, DIG. 13, 160; 250/342

[56] References Cited
UNITED STATES PATENTS

| | | | |
|---|---|---|---|
| 3,482,954 | 12/1969 | Yuen | 65/99 A X |
| 3,805,072 | 4/1974 | Goerens et al. | 250/342 |

*Primary Examiner*—Arthur D. Kellogg
*Attorney, Agent, or Firm*—Donald Carl Lepiane

[57] ABSTRACT

Apparatuses for attenuating a body of hot glass moving over a body of molten metal are each provided with a nip sensing device, a linear movement monitoring device and an angular movement monitoring device. The nip sensing device includes a plurality of discrete phototransistors positioned over the glass and molten metal in a direction generally transverse to the direction of glass movement. When the selected ones of the phototransistors are not conducting, the circuit operates to appropriately energize a motor to move the attenuating apparatus with respect to the edge of the ribbon to provide a nip width within a predetermined range. The linear movement monitoring device includes a potentiometer on each opposed attenuating apparatuses giving an output which is monitored to determine the width of the ribbon. The angular movement monitoring device includes a potentiometer which yields an output which varies with the movement of the apparatus along an arcuate path relative to the edge of the ribbon. In the preferred embodiment the output of the nip sensing device, and the potentiometers of the angular and linear movement monitoring devices, are forwarded to a computer which maintains the ribbon width within a predetermined range.

27 Claims, 13 Drawing Figures

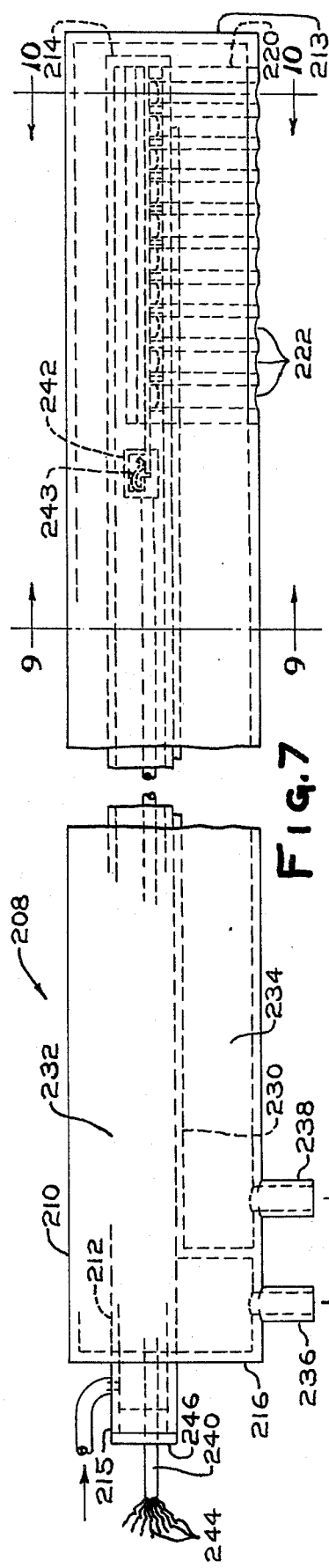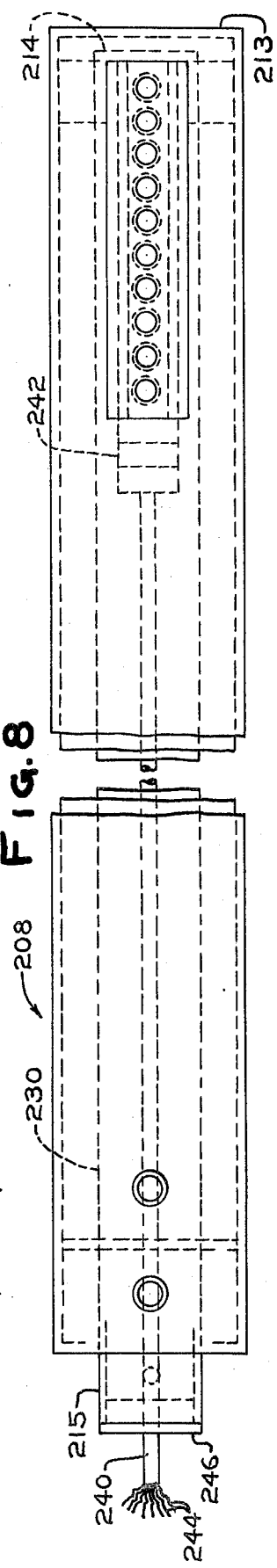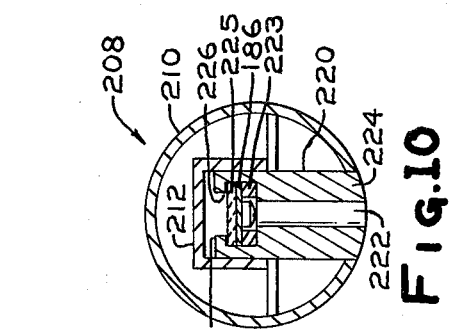

3,998,616

MANUFACTURE OF FLAT GLASS HAVING CONTROLLED WIDTH AND NIP WIDTH

CROSS REFERENCE TO RELATED APPLICATIONS

The method of making thin float glass disclosed in U.S. patent application Ser. No. 413,411 filed on Nov. 6, 1973, in the name of William F. Galey and entitled "Making Thin Float Glass" which application is a continuation-in-part of William F. Galey's U.S. patent application Ser. No. 252,673 filed on May 12, 1973, which, in turn, is a continuation-in-part of William F. Galey's U.S. patent application Ser. No. 198,274 filed on Nov. 12, 1971, is hereby incorporated by reference. All of the above-identified applications have been abandoned.

BACKGROUND OF THE INVENTION

1. Field of the Invention

This invention relates to improved attenuating apparatuses of the type used in the manufacture of flat glass having a nip sensing device, a linear movement monitoring device and an angular movement monitoring device which are used in combination to (1) maintain nip width within a predetermined range; (2) maintain the width of the glass within a predetermined range; and (3) center the glass in the forming chamber.

2. Discussion of the Technical Problem

In the practice of manufacturing flat glass, molten glass is moved through a delivery channel onto a molten bath of tin and a ribbon of glass is caused to form which is drawn and pulled along the bath and gradually cooled until it becomes dimensionally stable. Thereafter the glass ribbon is removed from the bath and is fed to an annealing lehr through which it passes to anneal the glass.

When supported on molten metal, molten glass naturally stabilizes on the molten bath of tin at a thickness of about 0.271 inch (6.87 millimeters). This thickness is called equilibrium thickness and in the absence of a controlled application of forces to the glass during forming, glass formed on tin thus obtained, has this thickness when cooled.

Glass less than equilibrium thickness can be obtained by pulling the glass by a force downstream of the delivery channel or near the lehr (often called lehr force) which stretches or attenuates the glass and causes it to move faster than when glass of equilibrium thickness is produced. However, the glass ribbon not only becomes thinner, it also becomes narrower unless the edges of the ribbon are restrained as by using edge roll machines, i.e., attenuating apparatus such as the type disclosed in U.S. Pat. No. 3,709,673.

In general, the attenuating apparatus includes an attenuating wheel that engages the upper surface of the body of hot glass. The angle subtended by the axis of the attenuating wheel and the glass path defines an angle of attenuation that has positive degrees when the axis of the attenuating wheel is angled toward the delivery channel.

A pair of opposed attenuating apparatuses have their respective attenuating wheels applying longitudinal and transverse forces to maintain the ribbon within a desired width.

Although the attenuating apparatuses used in the art are ideally suitable for applying longitudinal and transverse forces to the molten body of glass to provide a glass ribbon of a desired width, there are limitations. More particularly, the apparatuses are not provided with a nip sensing device which maintains the nip width within a predetermined range. The nip width as the term is used herein, is defined as that distance between the attenuating wheel and the edge of the ribbon. Maintaining the nip width within a predetermined range is desired. This is because the attenuating wheel which engages the upper surface of the ribbon leaves a wheel mark which makes that portion of the ribbon unusable. Further, during attenuation of the glass, the glass tends to neck down, i.e., decrease in width. If one of the pair of attenuating wheels disengages the glass, the other attenuating wheel tends to pull the glass toward itself. When this occurs, the ribbon jams against the sidewall of the container for the molten metal.

Further, the attenuating apparatuses of the prior art are not provided with a system for maintaining the ribbon in the center of the bath. This is desired when it is realized that a more uniform heating from the center toward the edges of the ribbon is obtained when the center of the molten glass is centered in the bath.

Still further, the attenuating apparatuses of the prior art are not provided with facilities which continually monitor and adjust the attenuating angle to maintain the width within a predetermined range. More particularly, as the molten glass moves along the supporting molten metal, the width varies. By maintaining the width within a predetermined range by automatically adjusting the angle of attenuation a more uniform ribbon width can be achieved.

Although in the prior art there are various types of apparatuses which can determine the boundary between the glass edge and the molten tin, for example, U.S. Pat. Nos. 3,764,285; 3,805,072; and 3,794,477, the apparatuses are used separately and are not integrally attached to an attenuating apparatus. In most instances, the devices of the prior art which determine the boundary between the glass and molten bath are bulky in size and are not easily attached to the attenuating apparatuses.

It would be advantageous therefore if an attenuating apparatus of the type used in the rior art were provided with facilities to determine nip width, ribbon width, and center the ribbon in the molten bath.

SUMMARY OF THE INVENTION

This invention relates to a device used in combination with an attenuating apparatus for maintaining nip width of a glass ribbon in a predetermined range. The glass ribbon is moved along a glass ribbon movement path on a pool of supporting molten metal. The attenuating apparatus is of the type which includes facilities for applying translational and longitudinal forces to the glass ribbon and facilities for moving the applying means along a first reciprocating path generally transverse to the glass ribbon movement path. The applying facilities include engaging facilities, e.g., a rotatably mounted wheel or screw in surface engagement with the upper surface of the glass ribbon. The device includes facilities for sensing the incremental displacement of the edge of the glass ribbon along a second reciprocating path generally parallel to the first reciprocating path and facilities for mounting the sensing facilities in spaced relation to the engaging facilities and over the surface of the supporting molten metal and the upper surface of the glass ribbon. Facilities responsive to the sensing facilities and acting on the moving facilities move the applying facilities in the first direction to increase the nip width when the nip width as indicated by the sensing facilities is at least equal to or below the minimum nip width of the predetermined range and move the applying facilities in a second direction opposite to the first direction to decrease the nip width with the nip width as indicated by the sensing facilities is at least equal to or greater than the maximum nip width of the predetermined range.

This invention also relates to a linear movement monitoring device which may be used in combination with the attenuating apparatus of the type previously discussed. The linear movement monitoring device includes facilities responsive to the movement of the moving facilities for generating a signal during movement thereof along a reciprocating path and facilities responsive to the generating facilities for converting the signal from the signaling facilities to linear dimensions to determine distance and direction of movement of the moving facilities along the reciprocating path.

This invention also relates to an angular movement monitoring device which is used in combination with an attenuating apparatus of the type previously discussed and having a vase for supporting the applying facilities. The base is pivotally mounted for movement along a reciprocating arcuate path. The arcuate movement monitoring device includes facilities for generating a signal in response to the movement of the base and facilities responsive to the generating facilities for converting the signal from the generating facilities to determine the distance and direction of the movement of the base along the reciprocating arcuate path.

Still further, this invention relates to an improved apparatus for attenuating a glass ribbon which is moved along a ribbon movement path from a pool of supporting molten metal. The attenuating apparatus is of the type previously discussed. The improvement includes facilities for sensing the incremental displacement of the edge of the glass ribbon along a second reciprocating path generaly parallel to the first reciprocating path and facilities for mounting the sensing means in spaced relation to the wheel and over the surface of the supporting molten metal and upper surface of the glass ribbon. Facilities responsive to the sensing facilities act on the moving facilities for moving the applying facilities in a first direction to increase the nip width of the glass ribbon when the nip width as indicated by the sensing facilities is at least equal to or below a minimum nip width of a predetermined range and for moving the applying facilities in a second direction opposite to the first direction to decrease the nip width as indicated by the sensing facilities is at least equal to or greater than a maximum nip width of the predetermined range. First facilities responsive to the movement of the moving facilities for generating a first signal during movement of the moving facilities and first facilities responsive to the first generating facilities for converting the signal from the signaling facilities to linear dimensions to determine distance and the direction of movement of the moving facilities along the reciprocating path are provided. Second facilities for generating a signal responsive to the movement of the base and a second facilities responsive to the second generating facilities converts the signal to degrees to determine distance and direction of the base movement are also provided.

This invention also relates to a method of manufacturing flat glass including the steps of providing molten glass on a pool of supporting molten metal and flowing the molten glass downstream along a ribbon movement path on the pool of molten metal. Attenuating forces are applied to the glass ribbon while the glass ribbon is cooled to form a dimensionally stable ribbon. Thereafter the dimensionally stable glass ribbon is removed from the supporting molten metal. The attenuating forces which are applied to the unsupported surface of the glass ribbon is accomplished by using attenuating facilities adjacent the edges of the glass ribbon. The improvement includes the steps of sensing the distance between the edge of the ribbon and the position on the ribbon where the attenuating forces are applied to determine nip width. The sensing step is accomplished using sensing facilities. Thereafter the attenuating facilities are moved in response to the sensing facilities (1) in a direction to decrease the nip width when the nip width is greater than a predetermined amount and (2) in a second direction opposite to the first direction to increase the nip width when the nip width is less than the predetermined amount.

This invention also relates to a method of determining the width of the glass ribbon during the manufacture thereof. The glass ribbon is manufactured as previously discussed in a container having sidewalls spaced a known distance apart. The improvement includes the steps of generating a first signal for each of the engaging facilities which is a function of the distance from the engaging facilities to the adjacent edge of the ribbon. A second signal is also generated for each of the engaging facilities which is a function of the distance from the sidewall of the container to adjacent engaging means. Thereafter the first and second signals are operated on to determine the width of the ribbon at the location of the engaging facilities along the movement path.

Still further, this invention relates to the method of manufacturing a flat glass ribbon as previously discussed. Ths improvement includes generating a first signal for each of the engaging facilities and a second signal for each of the engaging facilities as previously discussed. A third signal is generated for each of the engaging facilities which is a function of the angle subtended by the axis of the engaging facilities and the ribbon path defined as an angle of attenuation. The first and second signals are operated on to determine the width of the ribbon at the location of the engaging facilities. Thereafter the determined width is compared to a desired width to determine an angle of attenuation to provide the desired width at the location of the engaging facilities. Thereafter the engaging facilities are operated on to set each of the engaging facilities at the determined angle of attenuation as indicated by the third signal to provide a desired ribbon width at the location of the engaging facilities.

BRIEF DESCRIPTION OF THE DRAWING

FIG. 6 is a plane view of a nip sensor incorporating features of the invention;

FIGS. 7 and 8 are plane views of a water cooled barrel for supporting the nip sensor incorporating features of the invention;

FIG. 9 is a view taken along lines 9—9 of FIG. 7;

FIG. 10 is a view taken along lines 10—10 of FIG. 7;

DESCRIPTION OF THE INVENTION

Figure 1:
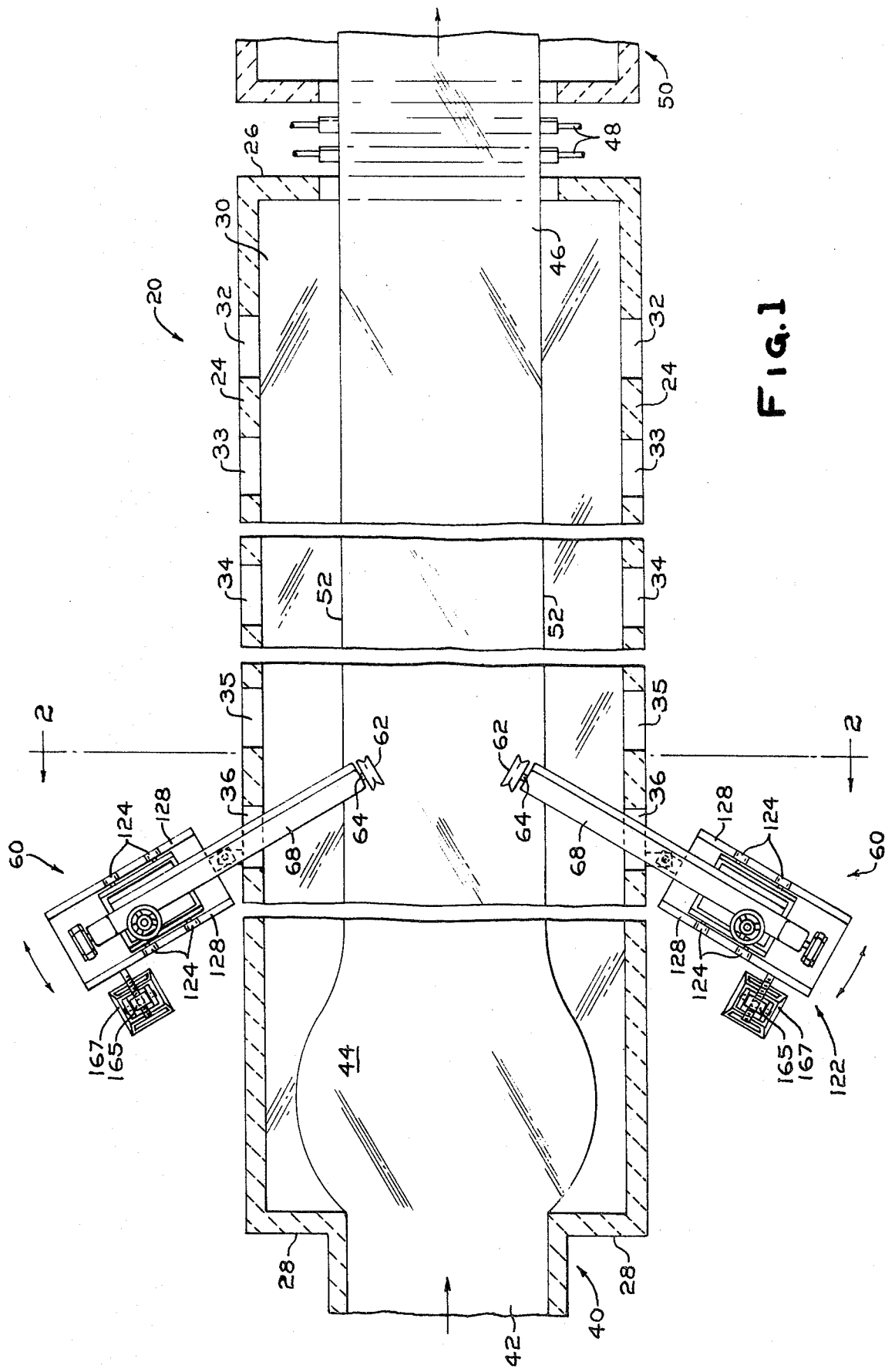
FIG. 1 is a fragmented plane view of a float chamber having portions removed for purposes of clarity illustrating a pair of attenuating apparatuses incorporating features of the invention.
Figure 2:
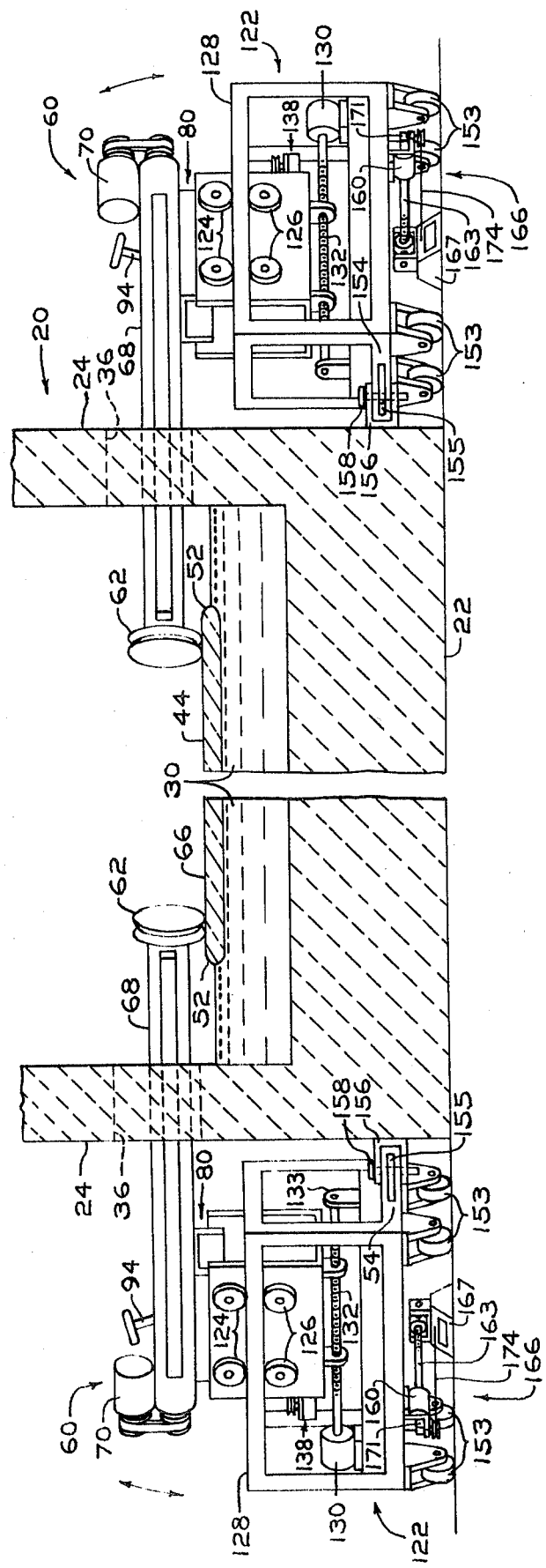
FIG. 2 is a view taken along lines 2—2 of FIG. 1.

Referring to FIG. 1, there is shown a section of the interior of a float chamber 20 of the type known in the flat glass manufacturing art. Referring to FIGS. 1 and 2, the chamber 20 includes a refractory bottom 22, refractory sidewalls 24, refractory exit lip 26 and refractory back walls 28 to form a container for containing a pool of supporting molten metal 30, e.g., tin or an alloy of tin. The chamber 20 is provided with a plurality of opposed bays, e.g., bays 32 to 36 for providing access to the interior of the float chamber 20.

Th chamber 20 is connected to a delivery channel 40 through which molten glass 42 is moved at a controlled rate in any conventional manner onto the pool of molten metal 30 to form a body of hot glass 44 on the molten bath 30. As the body of hot glass 44 moves downstream from the delivery channel 40 in the direction of the arrow, the body of hot glass 44 undergoes attenuation and cooling to form a dimensionally stable glass ribbon 46.

The glass ribbon 46 is moved over the exit lip 26 of the chamber 20 and conveyed by way of rollers 48 into an annealing lehr 50 of the type used in the art.

As will become apparent, the invention is not limited to any particular type of forming chamber. For example, the invention may also be practiced using the glassmaking apparatus taught in U.S. Pat. No. 3,843,346.

"Attenuation of the body of hot glass" as the term is used herein is defined as a controlled reduction in glass thickness by applying longitudinal and transverse forced adjacent edges 52 of the body of hot glass 44 as the body of hot glass moves downstream through the chamber 20. The reduction in thickness may be made with or without a change in ribbon width. Applying longitudinal and transverse forces to the body of hot glass makes the body of hot glass thinner and narrower. The attenuation of the body of hot glass may be accomplished using any attenuating apparatus of the type known in the art.

With reference to FIG. 2, there is shown a pair of attenuating apparatuses 60, each identical in construction, that may be used in the practice of the invention. In general, the attenuating apparatus 60 includes an attenuating facilities, e.g., a wheel 62 or screw securely mounted on the end of a shaft 64 (shown in FIG. 1).

The attenuating wheel engages top surface 66 of the body of hot glass adjacent an edge 52 to apply forces which attenuate the body of hot glass in a manner to be discussed below. The shaft 64 is advantageously rotatably mounted in a water cooled barrel 68 in any conventional manner. A wheel, shaft, and barrel arrangement that may be used in the practice of the invention is taught in U.S. Pat. No. 3,709,673 which teachings are hereby incorporated by reference.

Figure 3:
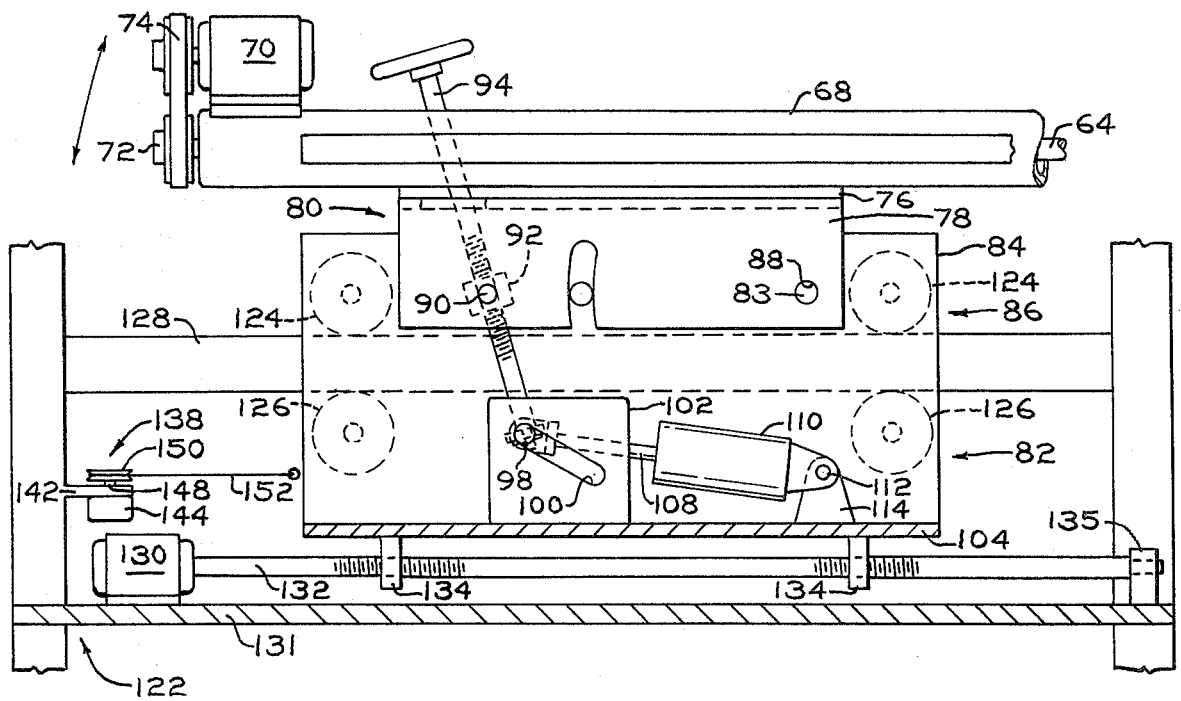
FIG. 3 is an exploded view of the carriage mechanism of the attenuating apparatuses incorporating features of the invention and having portions removed for purposes of clarity.

Referring now to FIG. 3, mounted on the barrel 68 in any conventional manner is a variable speed motor 70. The motor 70 is operatively connected to a drive wheel 72 by a drive belt 74 to rotate the shaft 64 and attenuating wheel 62 at a preselected constant speed.

The barrel 68 is advantageously mounted to a plate 76. A pair of opposed legs 78 are mounted to the plate 76 to provide a generally inverted U-shaped member 80 (see also FIG. 2). The member 80 is pivotally mounted, in any conventional manner, to a carriage 82 for raising and lowering the barrel toward and away from the top surface 66 of the body of hot glass 44 to move the attenuation wheel 62 into and out of engagement, respectively, with the body of hot glass.

For example and with continued reference to FIG. 3, a shaft 83 has its ends mounted in sidewalls 84 of the carriage 82 and passes through holes 88 in the legs 78 of the member 80. Pivotally mounted between the legs 78 of the member 80 at 90 is a nut 92. A threaded shaft 94 passes through the plate 76 of the member 80, is threaded through the nut 92 and is pivotally mounted at 96 to a shaft 98 as shown in FIG. 4.

Figure 4:
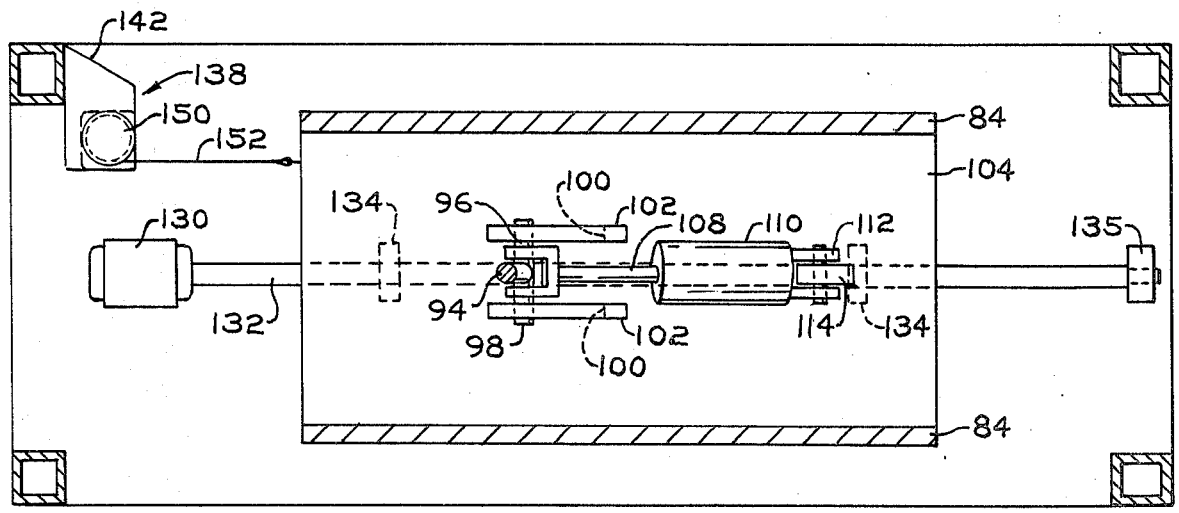
FIG. 4 is a top view of FIG. 3 having portions removed for purposes of clarity.

Referring to FIGS. 3 and 4, the shaft 98 has its ends slideably mounted in a groove 100 of opposed plates 102 mounted in spaced relation on base 104 of the carriage 82. Piston 108 of air cylinder 110 is pivotally mounted at 96 to the shaft 98 in any conventional manner. The end of the air cylinder 110 is pivotally mounted at 112 to a plate 114 secured to the base 104 of the carriage 82.

Movement of the piston 108 into and out of the air cylinder 110 provides coarse adjustment of the attenuating wheel 62 relative to the top surface 66 of the body of hot glass 44. For example, when the piston 108 is urged out of the cylinder 110, the shaft 98 slides upward in the grooves 100 to urge the threaded shaft 94 upwardly as viewed in FIG. 3. As the threaded shaft is urged upwardly, the member 80 is pivoted in a clockwise direction as viewed in FIG. 3 to move the attenuation wheel 62 toward the surface 66 of the body of hot glass 44. When the piston 108 is retracted into the cylinder 110, the member 80 moves in a counterclockwise direction as viewed in FIG. 3 to move the attenuation wheel 62 away from the top surface 66 of the body of hot glass 44.

For fine adjustments, e.g., to position the wheel 62 on the top surface 66 of the body of hot glass, the threaded shaft 94 is turned in a first direction which pivots the member 80 in a clockwise direction as viewed in FIG. 3 to move the wheel 62 into engagement with the top surface 66 of the body of hot glass 44.

The carriage 82 is mounted for reciprocal movement toward and away from the chamber 20 on a base 122 in any conventinal manner. For example, the outer surface of each of the sidewalls 84 of the carriage 82 is provided with a pair of upper wheels 124 and lower wheels 126 positioned about adjacent opposed horizontal members or guiderails 128 of the base 122 (see also FIGS. 1 and 2).

Referring now to FIGS. 3 and 4, a motor 130 is advantageously mounted on a platform 131 of the base 122 and is operatively connected to one end of a threaded shaft 132 as shown in FIG. 3. The shaft 132 passes through a pair of spaced nuts 134 securely mounted on the underside of the carriage 82. The other end of the shaft 132 is advantageously rotatably mounted at 133 as shown in FIG. 3.

Referrng now to FIGS. 1, 2 and 3, rotating the shaft 132 in a first direction moves the carriage 82 along the guiderails 128 to move the barrel into the float chamber i.e., to move the wheel 62 away from the inner surface of the adjacent sidewall 24 of the float chamber, over the glass 44. Rotating the shaft 132 in an opposite or second direction moves the carriage along the guiderails to move the barrel out of the float chamber, i.e., to move the wheel 62 toward the inner surface of adjacent sidewall 24 of the float chamber 20.

To monitor the movement of the carriage 82 and the ribbon width, there is provided a linear movement monitoring device 138 incorporating features of the invention and shown in FIGS. 3 and 4. The monitoring device 138 is mounted to the base 122 by way of plate 142. The device 138 includes a potentiometer 144 having its stem 148 passing through the plate and rotatably mounted therein. A spring biased wheel 150 is secured to the stem. A cable 152 has one end secured to the wheel 150, rolled up thereon with the other end of the cable 152 connected to the carriage 82.

A voltage is impressed across the potentiometer 144 which is proportioned to the total extension length of the cable 152. As the carriage 82 moves toward the float chamber as previously discussed, the cable 152 is pulled from the wheel 150 against the biasing action of the spring biased wheel 150. As the wheel rotates, the voltage output of the potentiometer 144 increases. As the carriage moves away from the float chamber, the wheel 150 rotates to (1) reel in the cable 152 and (2) decrease the voltage output of the potentiometer 144. By monitoring the voltage output of the potentiometer, the displacement and the direction of the carriage can be determined.

Providing a linear movement monitoring device on each opposed attenuating apparatuses, the distance between attenuating wheels can be determined thereby making it possible to determine the width of the molten glass or glass ribbon at the location of the pair of attenuating apparatuses.

For example, the voltage signal of each potentiometer is calibrated in inches or other convenient units of length. The wheel 62 of each attenuating device 60 is spaced a predetermined distance from the inner surface of the adjacent sidewall of the float chamber. The barrel 68 of each attenuating device 60 is moved into the chamber to move the attenuating wheel away from the inner surface of the adjacent sidewall of the float chamber with the displacement of travel being indicated by the voltage output of the potentiometer. Thereafter the wheel 62 is moved into engagement with the top surface 66 of the glass 38 as previously discussed. The width of the glass between opposing wheels can be determined by summing (1) the displacement of each carriage as determined by the voltage output of the potentiometers and (2) the predetermined distance of each attenuating wheel from the inner surface of adjacent sidewall and subtracting the sum from the width of the chamber.

Further, the linear movement monitoring device 138 may be used as an indicator for centering the glass in the float chamber by adjusting the wheels 62 into engagement with the glass as previously discussed and incrementally moving the carriages 82 until the voltage output change of the potentiometer 144 of opposed pairs of attenuating devices are approximately equal.

Referring now to FIG. 2, the base 122 is advantageously provided with wheels or casters 153 for ease of moving the base. Provided at the end 154 of the base 122 is a tongue 155 which is moved into hitch 156 mounted on the outer surface of the sidewalls 24 of the chamber 20. A pin 158 passes through the hitch 156 and the tongue 155 to prevent the base from moving away from the sidewall while providing arcuate movement of the base relative to the movement of the glass as shown by the arrows in FIG. 1. Moving the base along the arcuate path provides adjustment of the attenuation angle of the wheel 62 of the attenuating apparatus with respect to the glass for adjusting opposed lateral forces to increase or decrease the ribbon width.

Figure 5:
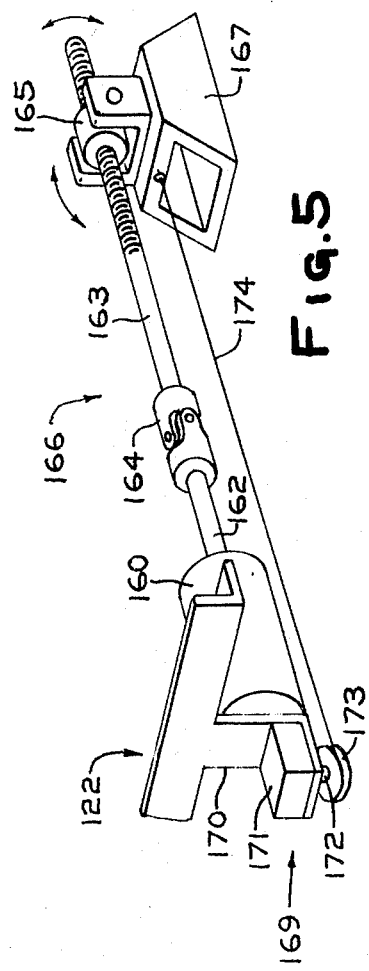
FIG. 5 is an isometric view of an angular movement monitoring device incorporating features of the invention.

Referring now to FIGS. 2 and 5, the base 122 may be moved along the arcuate path by providing a motor 160 securely mounted to the underside of base 122 as shown in FIG. 2 for rotating an end of a shaft 162. The shaft 162 is joined to an end of a threaded shaft 163 by a universal joint 164. The other end of the shaft 163 is mounted in a threaded nut 165 in a yoke 166 for pivotal movement in a vertical plane. The yoke 166 is mounted in a platform 167 for rotational movement in a horizontal plane. The platform 167 is advantageously mounted to the floor.

When the base 122 is at the initial position, the axis of the shaft 64 is perpendicular to the sidewall 24 of the chamber 20, i.e., an angle of attenuation of "0"°. Rotating the shafts 162 and 163 by way of the motor 160 in a first direction moves the base 122 from the initial position to a positive oblique angle, subtended by the axis of the attenuating wheel shaft and the perpendicular to the chamber sidewall 24, i.e., the initial position. Positive angles of attenuation are defined when the base is rotated about the pin 158 toward the delivery channel 40 as shown in FIG. 1. Rotating the shafts 162 and 163 in a second direction moves the axis of the shaft 64 from the initial position to set the axis of the shaft 64 at a negative oblique angle of attenuation subtended by the perpendicular to chamber sidewall 24 and the axis of the attenuating wheel shaft 64. More particularly, rotating the shafts 162 and 163 in the second direction moves the base 122 about the pin 158 away from the delivery channel 40.

With continued reference to FIG. 1, the attenuating apparatuses 60 are set at a positive angle of attenuation. Normally the angle of attenuation of multiple pairs of attenuating devices 60 will be set for producing a glass ribbon of highest optical quality and/or a particular ribbon width. This may be accomplished by setting the opposed pair of attenuating apparatus farthermost downstream from the delivery channel 40 at a greater positive oblique angle of attenuation than the upstream pair of attenuating devices.

As will be appreciated, the angle of attenuation is not limiting to the invention. In U.S. patent application Ser. No. 413,411 now abandoned filed in the name of William F. Galey on Nov. 6, 1973, and entitled "Making Thin Float Glass" there is taught a method of making thin float glass of high quality and low optical distortion by applying longitudinal and transverse forces using pairs of attenuating wheels such as the type under discussion. The above-mentioned U.S. patent application may be referenced to determine the angle of attenuation; the rotational speed of the attenuation wheel and the position of the attenuation apparatus along the downstream path of the body of hot glass to provide different thicknesses of thin float glass of high quality and low optical distortion.

With continued reference to FIG. 5, an angular movement monitoring device 169 is mounted to the underside of the carriage 122 adjacent the motor 160. The angular movement monitoring device 169 and linear movement monitoring device 138 (see FIGS. 3 and 4) are identical in construction and operation. The device 169 is mounted to the underside of the carriage 122 by way of plate 170. A potentiometer 171 has its stem 172 passing through the plate 170 and rotatably mounted therein. A spring biased wheel 173 is secured to the stem with a cable 174 having one end secured to the wheel 173, rolled up thereon and with the other end of the cable 174 connected to the platform 167.

A voltage impressed across the potentiometer 173 is proportional to the arcuate motion which is determined by measuring the cord of the arc using the cable 174. More particularly, as the base 122 moves along the arcuate path, as previously discussed, the voltage output of the potentiometer changes to measure the cord of the arc of the arcuate path. In this manner the angle subtended by the shaft 64 of the attenuating apparatus 60 and the perpendicular to the chamber sidewall 24, i.e., the angle of attenuation, can be measured.

The discussion will now be directed to a nip sensing device incorporating features of the invention for determining and/or maintaining nip width, i.e., the distance between the attenuation wheel 62 and adjacent edge 52 of the body of hot glass within a predetermined range. As can be appreciated, maintaining the nip width within a predetermined range has distinct advantages, e.g., (1) reduction in nip width which reduces waste, (2) a maximum usuable ribbon width and (3) prevents disengagement of the hot body of glass by the attenuation wheel.

With reference to FIG. 6, a nip sensing head 175, in general, includes a plurality of irradiance sensing devices or phototransistors, e.g., 10 phototransistors 176–185 preferably mounted in spaced relationship on a printed circuit board 186. The collector 188 of each phototransistor is electrically connected to a common tab 190 located at end 192 of the printed circuit board 186. The emitter 193 of each of the phototransistors 176–185 is connected to a lead tab 194–203, respectively.

As will be appreciated, the number of phototransistors used is optional and depends on the degree of control or resolution of nip width. More particularly, how fine a nip width can be measured in which it is desired to operate. For the sake of discussion, 10 (10) phototransistors will be used.

The phototransistors preferably used are of the type that increase in conductivity as irradiance sensed increases and decreases in conductivity as the irradiance sensed decreases. Irradiance as the term is used is the radiated power per unit area incident upon the surface of the phototransistors. The usual unit of irradiance is watts per square centimeter.

At any particular point along the path of movement of the molten body of glass, the temperature of the molten metal is approximately equal to the temperature of the molten body of glass. However, the irradiance of the molten glass is higher than the irradiance of the molten metal at the same temperature. Therefore, when a phototransistor is over molten glass, the conductivity of the phototransistor increases which increases the output current of the phototransistor. When the phototransistor is over molten tin, the conductivity decreases which decreases the output current of the phototransistor. Connecting a load resistor to the phototransistor provides a signal voltage to indicate whether the phototransistor is over molten glass or molten tin. More particularly, when the output current of the phototransistor increases, e.g., when the phototransistor is over glass, the signal voltage increases across the load resistor. When the output voltage decreases, e.g., when the phototransistor is over the molten tin, the signal voltage decreases across the load resistor.

Further, the phototransistor selected should have a high sensitivity due to spectral response overlap of the phototransistor and the radiating power of the glass at a particular temperature. In other words, the phototransistor selected should have the highest output possible in the spectral area where the responsiveness of the phototransistor overlaps the spectrum of radiation of the glass at a particular temperature.

The discussion will now be directed to a water cooled arm for positioning the sensing head 175 in the forming chamber 20 adjacent the attenuating wheel 62 such that the phototransistors lie in a plane parallel to the axis of the shaft of the attenuating apparatus and substantially transverse to the flow of the glass such that the sensing head is over the top surface of the glass and molten metal. In this manner, the nip sensor can sense the boundary between the glass edge 52 and the molten bath 30. As will be appreciated, the water cooled support arm to be discussed is merely illustrative of one that may be used and is not limiting to the invention.

Referring to FIGS. 7 and 8, water cooled support arm 208 includes an outer tube 210 and an inner tube 212 having closed ends 213 and 214, respectively. End 215 of the inner tube 212 extends through and beyond closed end 216 of the outer tube 210. The end 216 of the outer tube is hermetically sealed to the inner tube to provide for flowing a cooling medium through the outer tube in a manner to be discussed below.

Referring also to FIGS. 9 and 10, the inner tube 212 has a generally rectangular shape to accommodate the nip sensing head 175. Adjacent end 214 of inner tube 212 there is provided a block 220 having a plurality of passageways 222 equal to the number of phototransistors mounted on the printed circuit board 186 of the sensing head 175. Spacer blocks 223 and 225 are provided about the circuit board 186 for maintaining the phototransistors in alignment with the passageways and for protecting wires on the nip sensing head.

As shown in FIG. 10, the passageways 222 of the block 220 extend from side 224 to a keyway 226 provided at the opposite end 228 of the block 220. The keyway 226 has a configuration and dimensions sufficient for receiving the nip sensing head 175 and the spacer blocks 223 and 225 with ones of the phototransistors spaced above ones of the passageways 222.

The side 224 of the block 220 passes through the wall of the outer tube 210 and is hermetically sealed therein as by welding. The opposite end 228 of the block passes through the inner tube 212 and, in a like manner, is hermetically sealed therein as by welding.

Referring now to FIGS. 7 and 8, and "L"-shaped baffle 230 has one end and sides hermetically sealed to the outer tube 210 and passes under the inner tube 212, around the block 220 with the other end spaced from closed end 213 of the outer tube 210 to provide compartments 232 and 234 within the outer tube 210. A cooling medium, e.g., water, is moved through inlet tube 236 around the inner tube toward the end 213 of the outer tube 210, i.e., through compartment 232, between ends 213 and 214 of the outer and inner tubes 210 and 212, respectively, around the block 220 and toward the end 216 of the outer tube 210, i.e., through compartment 234. The water exits compartment 234 by way of outlet tube 238.

The nip sensing head having the spacers is inserted in the keyway 226 while providing external electrical access to the phototransistors in any conventional manner. For example, a hollow insertion rod 240 may be provided at one end with a bificated member 242. The bificated member is advantageously provided with electrically isolated spring fingers 243 one for each of the tabs 190 and 194–203 located at the end 192 of the printed circuit board 186 (see FIG. 6). Each of the spring fingers is electrically connected to an insulated wire 244 which extends through and out of the opposite end of the rod 240. In this manner, when the printed circuit board 186 is mounted in the keyway 226 of the block 220, external electrical access to the individual phototransistors is provided.

To prevent the passageways 222 of the block 220 from clogging up, and/or to eliminate condensation from forming on the sensing surface of the phototransistors, a plate 246 is mounted to the end 214 of the inner tube and an inert gas, e.g., nitrogen is moved through the inner tube 212 by way of gas inlet tube 248 and out of the inner tube by way of the passageways 222 of the block 220.

The center-to-center spacing of the passageways 222 in the block 220 as well as the center-to-center spacings of the phototransistors determines the resolution of nip width. Stated another way, the distance between the passageways determines the incremental change in nip width which is sensed. For example, for a ½ inch (1.27 centimeters) center-to-center spacing, incremental changes of ½ inch (1.27 centimeters) in the nip width can be sensed. Bringing the passageways closer together decreases the incremental change of nip width sensed.

As can be appreciated, the field of view of the phototransistor is relevant to the dimension of the passageways 222. It is recommended that the field of view of adjacent transistors do not overlap. This is to eliminate adjacent transistors from conducting when in fact the edge of the ribbon is between the transistors. To provide optimum resolution of the position of the ribbon edge relative to the phototransistors, it is recommended that the field of view be selected such that a phototransistor conducts when the edge of the glass is beneath the center of the phototransistor.

As previously mentioned, the phototransistors are connected to an electric circuit. Preferably the circuit is constructed to include a system for automatically operating the carriage motor 130 to move the carriage 82 toward or away from the sidewalls 24 of the float chamber 20, as previously discussed, to maintain nip width within a predetermined range. More particularly, when the nip sensing circuit indicates that the nip width is on the low side of the range, the circuit actuates the carriage motor 130 to move the carriage toward the outer surface of the sidewall, the attenuating wheel is moved away from the inner surface of the sidewalls toward the center of the glass body to increase the nip width. Conversely, when the nip sensing circuit indicates that the nip width is at the high side of the predetermined range, the circuit actuates the carriage motor to move the attenuating wheel toward the inner surface of the sidewalls and away from the center of the glass body to decrease the nip width.

Figure 11:
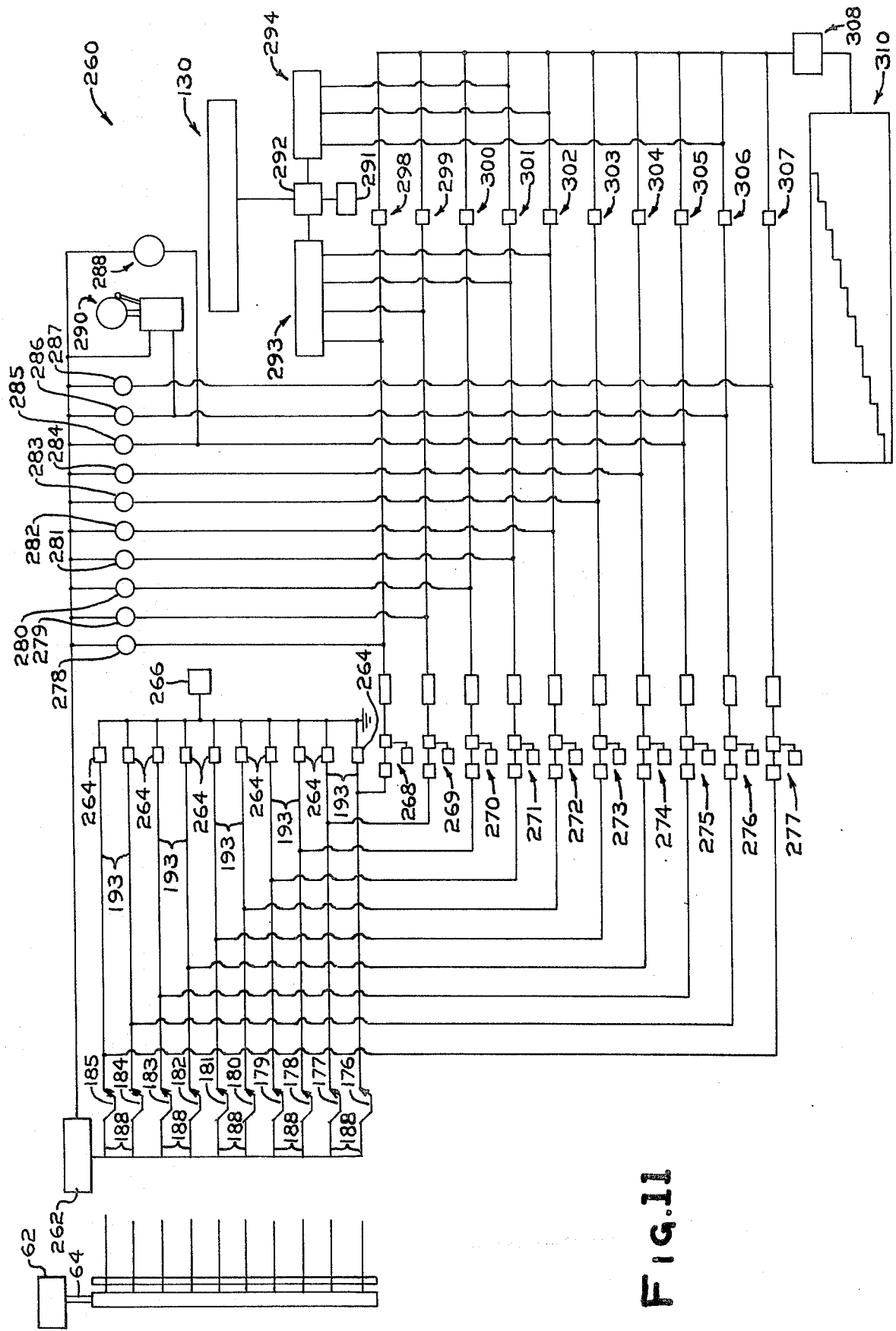
FIG. 11 is a wiring diagram of an electrical system incorporating features of the invention for maintaining a nip width within a predetermined range.

With reference to FIG. 11, there is shown an electric circuit 260 that may be used in the practice of the invention. As will be appreciated by those skilled in the art, the circuit is merely illustrative of one that may be used and the invention is not limited thereto. Further, the discussion will be directed to using 10 phototransistors; however, as can now be appreciated, more or less phototransistors may be used without deviating from the scope of the invention.

The collector end 188 of each of the phototransistors 176–185 is electrically connected to a constant dc voltage supply 262. The emitter end 193 of each of the transistors 176–185 is electrically connected to a potentiometer 264. The potentiometer 264 acts as a load resistor to adjust the output voltage signal such that the magnitude of the output signal for each transistor when it is conducting is substantially equal. Each potentiometer 264 is electrically connected to a temperature compensation trimmer 266 and to ground. The trimmer 266 adjusts the voltage output of the sensing device to compensate for the temperature variations of the glass. More particularly, the compensation trimmer 266 adjusts the output voltage signal for all the phototransistors such that changes in irradiance for the glass or tin produces a signal that is essentially constant.

The emitter end 193 of each of the phototransistors 176–185 is electrically connected to a comparator circuit 268–277, respectively, such as the type used in the art to amplify and compare an input signal to a reference signal. The comparator circuit compares the voltage input signal from the phototransistors to a reference voltage to determine which phototransistors are over glass and which phototransistors are over tin. The comparators associated with the phototransistors over glass, for example, have a positive output voltage signal and the comparator associated with the phototransistors over tin have a zero output voltage.

Electrically connected to the comparator circuits 268–277 are lamps 278–287, respectively, for visually determining which phototransistors are over glass and which phototransistors are over tin. Each of the lamps 278–287 are electrically connected to the voltage supply 262 to complete the circuit. When the phototransistor 185 is over the top surface of the glass and phototransistors 176–184 are over to the molten bath, the lamp 287 is lit, and lamps 278–286 associated with the phototransistors 176–184, respectively, are out. Knowing the distance from the phototransistor 185 to the attenuating wheel 62 and the distance between phototransistors, the nip width can be determined from the lamps 278–287 at a glance.

Audible and visual devices may be provided as a backup system to indicate when the nip width is extremely short and the possibility exists that the attenuating wheel may disengage the ribbon. A disengagement of an attenuating wheel causes the ribbon to be pulled to the other side by the opposed attenuating apparatus in contact with the glass.

A blinking light 288 and a buzzer 290 may be electrically connected to the power supply 262 and to any one of the lamps associated with any one of the phototransistors adjacent the attenuating wheel. As shown in FIG. 11, the blinking light 288 is connected to the lamp 285 and the buzzer 290 connected to the lamp 286. With the arrangement as shown in FIG. 11 when the phototransistor 183 is over tin, the light 288 blinks and when the phototransistor 184 is over tin, the buzzer 290 sounds.

The discussion will now be directed to a system for automatically maintaining the nip width within a predetermined range. With continued reference to FIG. 11, the carriage drive motor 130 is electrically connected to a power source 291 through a relay 292. The relay 292 is electrically connected to and operated by logic circuits 293 and 294. The logic circuit 293 is electrically connected to comparator circuits 268, 269, 271 and 272 which are electrically connected to phototransistors 176, 177, 179 and 180, respectively. When phototransistors 176 and 177 are over glass, the relay 293 is energized to energize the motor 130 to move the carriage 82 away from the outer surface of the sidewalls of the float chamber. The attenuating wheel moves toward the adjacent inner surface of the sidewall to decrease the nip width. The circuit 293 keeps the relay 292 energized until either the phototransistors 179 or 180 are over tin at which time the relay 292 is de-energized to stop the motor 130.

The logic circuit 293, electrically connected as shown in FIG. 11, is presented for illustration purposes only and is not limiting to the invention. For example, any one of the phototransistors may be selected to energize the relay 292.

Electrically connected to the comparator circuits 268–277 are inverter circuits 298–307, respectively. The inverter circuits change (1) a positive output signal from the comparator circuits to a zero voltage and (2) a zero output voltage signal from the comparator circuits to a positive voltage signal to operate the logic circuit 294 and digital-to-analog convertor circuit 308. When the logic circuit 294 is operative, it energizes the relay 292 to actuate the motor 130 to rotate the threaded shaft 132 in the first direction to move the carriage 82 toward the outer surface of the sidewalls of the float chamber. The attenuating wheel 62 moves away from the adjacent inner surface of the sidewall to increase the nip width.

The logic circuit 294 as shown in FIG. 11 for illustration purposes is electrically connected to the inverter circuits 301, 302, and 306 which in turn are electrically connected to phototransistors 179, 180 and 184, respectively. When the phototransistors 180 and 184 are not conducting, i.e., the phototransistors are over the molten bath, the logic circuit 294 energizes the relay 292 to actuate the carriage drive motor 130 to move the carriage as previously discussed. The carriage motor 130 remains operative until either the phototransistors 179 or 180 are over glass. When either the phototransistors 179 or 180 are over glass, the relay 293 is de-energized to stop the motor 130.

Electrically connected in series to inverters 298–307 is the digital-to-analog circuit 308 that sums the output of all the inverter circuits to indicate with summing voltage, the number of phototransistors over glass. The voltage output of the digital-to-analog circuit 308 may be plotted on a chart recorder 310 to show nip width by the voltage sum. Any other type of recording device, e.g., a computer 320 shown in FIGS. 12 and 13 to be discussed below may also be used.

A discussion will now be directed to an automatic control of the ribbon width by adjusting the angle of attenuation.

Figure 12:
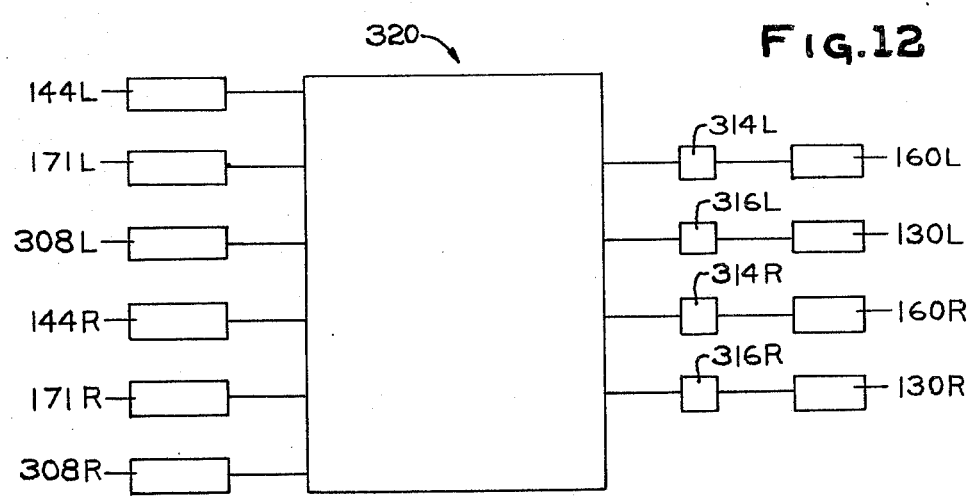
FIG. 12 is a block diagram of a system for automatically operating on the attenuating apparatus incorporating features of the invention for controlling the width of the ribbon and angle of attenuation.

Referring to FIG. 12 there is shown a schematic of a preferred system for adjusting the attenuation angle to control the width of the ribbon between a pair of attenuating apparatuses, for example, at bays 36 as shown in FIGS. 1 and 2. As was previously mentioned, the apparatuses at opposed bays 36 are identical in construction. For ease of the following discussion, similar elements of attenuating apparatus have the same reference member and followed by an "R" to designate that the element is associated with the attenuating apparatus on the right side of the forming chamber as viewed in FIG. 2. The letter L is used to designate that the element is associated with the attenuating apparatus on the left side of the forming chamber as viewed in FIG. 2.

The voltage output of the potentiometer 171L and 171R of the angular movement monitoring device 169L and 169R (shown in FIG. 5) of the attenuating apparatus 60L and 60R is forwarded to the computer 320. The output of the digital-to-analog circuit 308L and 308R associated with the attenuating apparatus 60L and 60R, respectively, is forwarded to the computer 320.

The output of potentiometer 144L and 144R of the linear movement monitoring device 138L and 138R associated with the attenuating apparatus 60L and 60R, respectively, is forwarded to the computer 320.

The computer 320 is programmed to determine the actual width of the ribbon from output of potentiometers 144L, 144R, 171L, and 171R and output from circuits 308L and 308R in a manner to be discussed below. The actual width determined is compared to a predetermined width programmed in the computer. If the actual width is less than the predetermined width, a signal is forwarded to relays 314L and 314R to actuate the motors 160L and 160R. The motors 160L and 160R rotate their respective attenuating apparatuses along the angular path to increase or decrease the attenuation angle a predetermined amount to achieve a calculated angle of attenuation to yield the desired ribbon width. As the motors 160R and 160L change the attenuation angle of their respective attenuating apparatus, the output signal of the potentiometers 171R and 171L vary as a function of the angle. When the apparatuses are at the new angle as indicated by the potentiometers 171L and 171R, the relays 314L and 314R are de-energized to de-energize the motor 160L and 160R, respectively.

As can now be appreciated by those skilled in the art, the invention is not limited to the computer program and any program employing principles discussed, supra, may be used. For example, the actual ribbon width (ARW) is equal to the forming chamber width (FCW) at the location of the attenuating apparatuses plus the nip width as indicated by output of circuits 308L and 308R less the sum of the distance indicated by the potentiometers 144L and 144R of the linear movement monitoring devices 138L and 138R, respectively. The above is shown below as Equation 1.

$$ARW = FCW - (P_{144L} + P_{144R}) + (C_{308L} + C_{308R}) \qquad (1)$$

where:

ARW and FCW are as previously defined;

$P_{144L}$ and $P_{144R}$ is the distance indicated by the voltage output of the potentiometers 144L and 144R, respectively; and $C_{308L}$ and $C_{308R}$ is the distance indicated by the voltage output of the circuit 308L and 308R.

The computer apparatus 320 operates (1) on the voltage output of potentiometers 144L and 144R and (2) on the voltage output of the circuit 308R and 308L to convert their respective voltage output to inches or centimeters.

The ribbon width error (RWE) is equal to the predetermined ribbon width (RRW) at the location of measurement less the actual ribbon width. The above is shown below as Equation 2.

$$RWE = PRW - ARW \qquad 2$$

where:

RWE; PRW and ARW are as previously defined.

The angular displacement error (ADE) of an attenuating apparatus to provide a zero ribbon width error may be determined by Equation 3 shown below.

$$ADE = \arcsin (RWE/K) \qquad 3$$

where:

ADE and RWE are as previously defined; and

K is a gain constant which may be determined experimentally or empirically.

The term K is a function of the incremental ribbon width change for a degree of rotation of the apparatus along the angular path. The value of K may vary or be constant for each pair of bays and the thickness of the glass ribbon therebetween. The value of K for each pair of opposed bays can be determined experimentally by monitoring the ribbon width change, e.g., using Equation 1, for each degree of rotation as indicated by the angular movement monitoring device 160 (see FIG. 5) for a pair of attenuating apparatuses. For example, for each ¼° of rotation of the apparatus along the angular path as indicated by the angular movement monitoring device 160R and 160L, the width of the ribbon is determined as previously discussed using Equation 1.

Alternately, an initial K value can be determined empirically and thereafter a new K value can be determined during the glassmaking campaign if the initial K value is not accurate. For example, it can be assumed that for every ¼° change in the angle of attenuation, the ribbon width changes 1 inch (2.54 centimeters). Stated another way, for every 1° change in the angle of attenuation, the ribbon width changes 4 inches (10 centimeters). The Table of Trigonometric Functions shows that for every incremental increase of 1°, the sine value approximately increases 0.0174. This is true from a sine 0° to about a sine 10°. Dividing 4 inches (10 centimeters) by 0.0174 gives an empirical K value of about 230. If the empirically determined initial K value is inaccurate, a new value of K can be determined during the manufacture of glass in a similar manner as the experimental value of K was determined. The advantage of using an empirically determined initial K value is that an approximate K value is determined which establishes a starting point. If experimental determination of a K value is made, unacceptable glass ribbon may be produced, until the K value is determined.

The new angle setting (NAS), ie., the angle of attenuation to yield the predetermined width, is equal to the angular displacement error (ADE) plus the actual angular setting (AAS) as determined by the potentiometers 171L and 171R. The above is shown below as Equation 4.

$$NAS = ADE + AAS \qquad 4$$

where

NAS; ADE and AAS are as previously defined.

If the ribbon width error is a value other than zero, relays 314R and 314L are energized to energize motors 160R and 160L, respectively, to rotate their respective attenuating apparatus along the angular path to the new angle setting as determined by Equation 4. When the attenuating apparatuses are at the new angular setting as determined by the potentiometers 171L and 171R, the relays are de-energized to de-energize the motors 160R and 160L, respectively.

The system as shown in FIG. 12 can also be used to maintain the center of the ribbon in the center of the forming chamber while adjusting the ribbon width. The ribbon width may be maintained as previously discussed. The program of the computer can be any of the types known in the art. The centering of the ribbon may be accomplished as follows:

The output of potentiometers 144L and circuit 308L are forwarded to the computer 320 to indicate the ribbon width in the left side of the forming chamber using Equation 5 shown below:

$$\tfrac{1}{2} FCW - P_{144L} + C_{308L} \qquad 5$$

where:

FCW; $P_{144L}$ and $C_{308L}$ are as previously defined.

The ribbon width on the right side of the forming chamber 20 is determined from the output of the potentiometer 144R and the output of the circuit 308R according to Equation 6.

$$\tfrac{1}{2} FCW - P_{144R} + C_{308R} \qquad 6$$

where:

FCW; $P_{144R}$ and $C_{308R}$ are as previously defined.

If Equation 5 is not equal to Equation 6, the ribbon is off center and is centered in the following manner. If Equation 5 has a value greater than Equation 6, a signal is forwarded to (1) relay 314L to energize the motor 160L to move the attenuating apparatus to a less positive angle and (2) relay 314R to energize the motor 160R to move the attenuating apparatus to a more positive angle. The attenuating apparatus preferably each move at the same angular speed. As the attenuating apparatuses are moved the output of the potentiometers 144L and 144R and 308L and 308R are monitored by the computer 320. When Equations 5 and 6 are equal, the relays 314L and 314R are de-energized to de-energize the motors 160L and 160R, respectively.

If Equation 6 is greater than Equation 5, the motors 160L and 160R operate their respective angle drive in an opposite direction.

Figure 13:
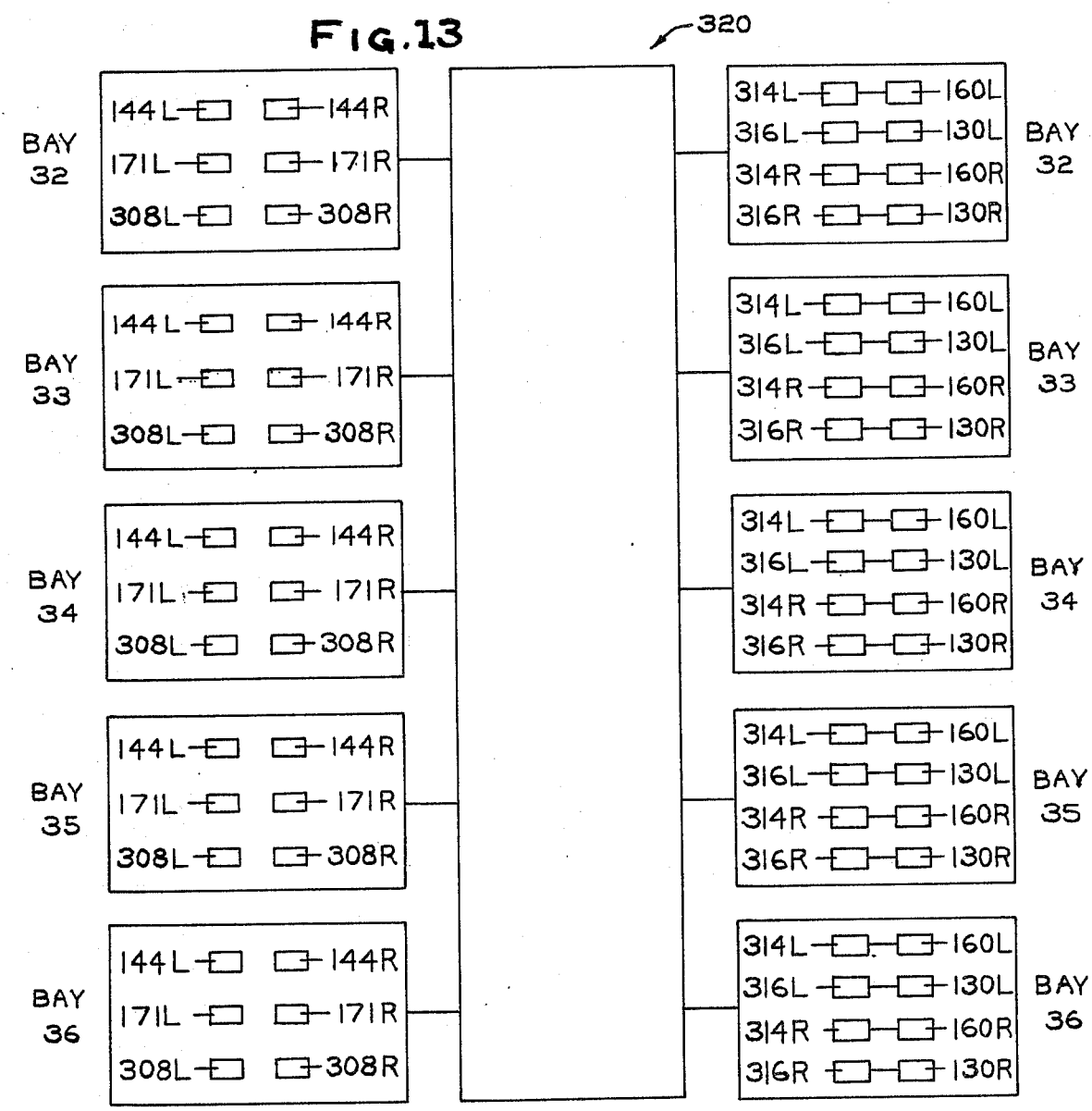
FIG. 13 is a block diagram similar to that of FIG. 12 illustrating a complete system for controlling 5 pairs of opposed attenuating devices each incorporating features of the invention for controlling the width of the ribbon and the angle of attenuation.

Referring to FIG. 13, there is shown a schematic which can be used to control pairs of attenuating apparatuses located at various bays along the forming chamber 20 to control ribbon width or center the ribbon in the bath. The pair of attenuating apparatuses can be operated as individual pairs as previously discussed or can be tied in with adjacent pairs of attenuating apparatuses for optimum control of ribbon width and optical quality of glass ribbon. For example, in certain instances, the actual ribbon width is of such a dimension that the angular adjustment of a pair of attenuating apparatuses required to attain a predetermined ribbon width would be detrimental to the optical quality and dimensions of the ribbon, e.g., cause lens effects in the glass ribbon and/or cause unacceptable ribbon thicknesses and widths. Therefore, only a partial angular adjustment should be made which results in a ribbon width less than the predetermined ribbon width. If the predetermined width at the remaining bays is not changed accordingly, the glass ribbon will not be gradually and uniformly attenuated and the resulting glass ribbon will not be of acceptable optical quality.

For illustration purposes only, it will be assumed that the attenuating apparatuses at bays 32 are the referenced apparatuses. The computer 320 determines the ribbon width error in accordance to Equation 2. The ribbon width error is compared to a maximum allowable ribbon width error change. If the ribbon width error is less than the maximum allowable ribbon width error change, the computer 320 determines the angular displacement error in accordance to Equation 3. The angle of attenuation change is made to the apparatuses at bays 32. The above is hereafter referred to as Condition $I_{32}$ for ease of discussion.

If the ribbon width error is greater than the maximum allowable ribbon width error change, then the angular displacement error is determined using the value of the maximum allowable ribbon width error change in place of the ribbon width error (RWE) value in Equation 3. The angle of attenuation change is made to the apparatus at bays 32 as previously discussed. The above is hereafter referred to as Condition $II_{32}$ for ease of discussion.

The computer 320 determines the ribbon width error for bays 33 using Equation 2. If Condition $I_{32}$ exists at bays 32, the computer 320 compares the ribbon width error at bays 33 to a maximum allowable ribbon width error change for bays 33. As before, if the ribbon width error calculated for bays 33 is less than the maximum allowable ribbon width error change for bays 33, i.e., Condition $I_{33}$, the computer 320 determines the angular displacement error according to Equation 3. The angle of attenuation change is made to the apparatuses at bays 33 as previously discussed.

Accordingly, when Condition $I_{32}$ exists at bays 32 and the ribbon width error at bays 33 is greater than the maximum allowable ribbon width error, change for bays 33, i.e., Condition $II_{33}$ the following occurs. The computer determines the angular displacement error using the value of the maximum allowable ribbon width error change for bay 33 in lieu of the ribbon width error value in Equation 3. The angle of attenuation change is made to the apparatuses at bays 33 as previously discussed.

Consider now the operation of the Computer 320 when Condition $II_{32}$ exists at bays 32. The predetermined ribbon width value for Equation 2 for bays 33 is changed accordingly to reflect that the predetermined width value for bays 32 has changed. More particularly, the new predetermined ribbon width for bays 33 is equal to the actual ribbon width at bays 32 plus the incremental ribbon width change between bays 32 and 33 for gradual attenuation of the ribbon. The ribbon width error for bays 33 is determined in accordance with Equation 2 using the new predetermined ribbon width value instead of the predetermined ribbon width value. The ribbon width error is compared to the maximum allowable ribbon width error change for bays 33. If the ribbon width error is less than the maximum allowable ribbon width error change, the computer 320 determines the angular displacement error in accordance to Equation 3. The angle of attenuation change is made to the apparatuses at bays 33 as previously discussed. The above is hereinafter referred to as Condition $III_{33}$ for ease of discussion.

If the ribbon width error for bays 33 is greater than the maximum allowable ribbon width error change, the following occurs. The angular displacement error is determined using the value of the maximum allowable ribbon width error change in place of the ribbon width error value for bays 33 in Equation 3. The angle of attenuation change is made to the apparatuses at bays 33 as previously discussed. The above is hereinafter referred to as Condition $IV_{33}$ for ease of discussion.

The computer 320 determines the ribbon width error for bays 34 using Equation 2. If Condition $I_{33}$ exists at bays 33, the computer 320 compares the ribbon width error at bays 34 to a maximum allowable ribbon width error change for bays 34. As before, if the ribbon width error calculated for bays 34 is less than the maximum allowable ribbon width error change for bays 34, i.e., Condition $I_{34}$, the computer 320 determines the angular displacement error according to Equation 3. The angle of attenuation change is made to the apparatuses at bays 34 as previously discussed.

Accordingly, when Condition $I_{33}$ exists at bays 33, and the ribbon width error at bays 34 is greater than the maximum allowable ribbon width error change for bays 34, i.e., Condition $II_{34}$, the following occurs. The computer determines the angular displacement error using the value of the maximum allowable ribbon width error change in lieu of the ribbon width error value in Equation 3. The angle of attenuation change is made to the apparatus at bays 34 as previously discussed.

Consider now the operation of the computer 320 when Condition $II_{33}$ exists at bays 33. The predetermined ribbon width value for bays 34 is changed accordingly to reflect that the predetermined width value for bays 33 has changed. More particularly, the new predetermined ribbon width value for bays 34 is equal to the actual ribbon width at bays 32 plus the incremental ribbon width change between bays 33 and 34 for gradual attenuation of the ribbon. As before, the computer 320 determines the ribbon width error for bays 34 using Equation 2 using the new predetermined ribbon width value instead of the predetermined ribbon width value. The ribbon width error is compared to the maximum allowable ribbon width change. If the ribbon width error is less than the maximum allowable ribbon width error change, i.e., Condition $III_{34}$, the computer 320 determines the angular displacement error in accordance to Equation 3. The angle of attenuation change is made to the apparatus at bay 34 as previously discussed.

If the ribbon width error for bays 34 is greater than the maximum allowable ribbon width error change, i.e., Condition $IV_{34}$, then the angular displacement error is determined using the value of the maximum allowable ribbon width error change for bays 34 in place of the ribbon width error change value in Equation 3. The angle of attenuation change is made to the apparatus at bays 34 as previously discussed.

The above is sequentially repeated for bays 35 and 36. In this manner, the glass as it moves through the chamber 20 is uniformly and gradually attenuated to provide a glass ribbon 46 that is of high optical quality.

As can be appreciated, ether parameters can be changed to effect the glass ribbon width and thickness. For example, changing (1) the volume of glass delivered into the forming chamber (2) the temperature gradient of the glass as it moves through the forming chamber and (3) the speed of the glass ribbon moving through the forming chamber can be varied to change ribbon width and ribbon thickness. However, for the above discussion, but not limiting to the invention, these parameters are considered to be constant.

DETAILED DESCRIPTION OF THE INVENTION

Attenuating apparatuses incorporating features of the invention will be described during attenuation of a body of hot glass 44 moving through a float chamber 20 (see FIG. 1) to maintain (1) a nip width within a predetermined range; (2) the width of the ribbon at discrete locations in the forming chamber within a predetermined range; and (3) the center of the glass in the center of the forming chamber.

With reference to FIG. 1, the body of hot glass 44 is formed by moving molten glass through delivery channel 40 onto a pool of molten tin 30 contained in the forming chamber 20. As the body of hot glass moves downstream through the forming chamber, it is controllably cooled and attenuated to provide a dimensionally stable ribbon of glass 46 having a predetermined width at exit lip 26. The glass ribbon 46 passes over the exit lip and is conveyed by rollers 48 into an annealing lehr 50 of the type used in the art.

The glass is attenuated by providing an attenuating apparatus 60 at each of opposed bays 36 spaced 50 feet (15.2 meters) from delivery channel 40; bays 35 spaced 60 feet (18.3 meters) from the delivery channel; bays 34 spaced 80 feet (24.4 meters) from the delivery channel; bays 33 spaced 100 feet (30.5 meters) from the delivery channel; and bays 32 spaced 110 feet (33.5 meters) from the delivery channel. In FIG. 1 only attenuating apparatus at opposed bays 36 are shown.

Each of the apparatus are identical in construction and one apparatus will be discussed with the understanding that the discussion is applicable to the other apparatuses unless otherwise stated.

An attenuating wheel 62 is securely mounted on an end of a shaft 64 (shown in FIG. 1). The shaft 64 in turn is rotatably mounted in the barrel and has a drive wheel mounted on the opposite end of the shaft 64. A barrel, shaft and attenuating wheel arrangement that may be used in the practice of the invention is disclosed in U.S. Pat. No. 3,709,673.

Referring now to FIG. 3, a variable speed motor 70 is advantageously mounted on the barrel 68 to rotate the shaft 64 by way of drive belt 74 and the drive wheel 72.

The barrel 66 is provided with pivotal movement toward and away from top surface 66 of the body of hot glass 44 (see FIG. 2) by mounting the barrel 68 to plate 76 of pivotally mounted member 80. Opposed lege 78 of the member 80 are pivotally mounted to carriage 82 by passing a shaft 84 mounted to sidewalls 84 (see FIG. 4) through holes 88 (one shown) in opposed legs 78 of the member 80.

A threaded shaft 94 extends through the plate 76 of the member 80, through nut 92 pivotally mounted at 90 to opposed legs 76 of the member 80 and has its end pivotally mounted at 96 to a shaft 98. Referring to FIGS. 3 and 4, the shaft 98 is captured in grooves 100 of opposed plates 102 mounted to base 104 of carriage 82.

An air cylinder 110 is pivotally mounted at 112 to plate 114 secured to the base 104 of the carriage 82. Piston 108 of the air cylinder 110 has its end pivotally mounted to the shaft 98 in any conventional manner. When the piston 108 is moved out of the cylinder 110, the member 80 is pivoted in a clockwise direction as shown in FIG. 3 to move the attenuating wheel toward the top surface of the glass. When the piston 108 is moved into the air cylinder 110, the attenuating wheel moves away from the top surface of the glass.

With continued reference to FIG. 3, motor 130 mounted on platform 131 of the base 122 is connected to one end of shaft 132. The threaded shaft passes through a pair of spaced nuts 134 mounted on base 104 of the carriage 82 with the other end of the shaft rotatably mounted to member 138 mounted on the base 122 in any conventional manner. Rotating the shaft 132 in the first direction moves the carriage 82 on upper and lower wheels 124 along guiderail 128 of the base 122 to move the barrel into the forming chamber. Rotating the shaft in a second direction moves the barrel out of the forming chamber.

The discussion will now be directed to the feature of the apparatus for controlling the nip width within a range of 4–6 inches (10.2 – 12.7 centimeters).

Referring to FIG. 6, nip sensing head 175 includes a printed circuit board 186 having 10 phototransistors or irradiance sensing devices 176–185 mounted thereon. The phototransistors are of the type sold by General Electric Catalog No. L14A502. The circuit board 186 is 9/16 inch (1.42 centimeters) × 6 inches (12.7 centimeters) and 1/6 inch (0.4 centimeter) thick. The phototransistors are on a ½ inch (1.27 centimeters) center-to-center spacing with phototransistor 185 spaced about ¼ inch (0.64 centimeter) from the side 322 of the printed circuit board.

The collector end 188 of each of the phototransistors is electrically connected to a common tab 190 located at side 192 of the printed circuit board 186. Emitter end 193 of each of the phototransistors 176–185 is electrically connected to a discrete electrically isolated lead tab 194–203, respectively, located at side 192.

Referring to FIG. 10, spacer blocks 223 and 225 each ¼ inch (0.64 centimeter) × 5¾ inches (14.6 centimeters) × 9/16 inch (1.42 centimeters) are provided. The spacer block 223 has holes therein for receiving and maintaining the phototransistors in position. The spacer block 225 is maintained on the back side of the circuit board 186 for protecting wires on the nip sensing head.

The sensing head 175 is mounted in a water cooled support arm 208 shown in FIGS. 7 and 8 in such a manner as to provide electrical access to each of the phototransistors from outside the support arm.

The support arm, in general, includes an inner rectangular tube 212 about 122 feet in length and having a cross-section of ¾ inch (1.92 centimeters) × ¾ inch (1.92 centimeters) and a wall thickness of 1/16 inch (0.16 centimeter) and an outer tube 210, 120 feet (36.8 meters) in length and having a circular cross-section having an outside diameter of 1¾ inches (4.4 centimeters) and a wall thickness of 5/32 inch (0.4 centimeter). Closed end 214 of the inner tube 212 is spaced about 2 inches (5 centimeters) from closed end 213 of the outer tube 210. Open end 214 of the inner tube extends through and is hermetically sealed to closed end 216 of the outer tube 210.

Referring to FIGS. 7–10, a block 220, 2 inches (5 centimeters) in height, 6 inches (15 centimeters) in length and ¾ inch (1.9 centimeters) wide is provided with 10 passageways extending from end 224 of the block and terminating at keyway 226 provided at the opposite end 228 of the block.

The end 224 of the block 220 is hermetically sealed in the wall of the outer tube 210 and the end 228 is hermetically sealed in the inner tube 212 adjacent closed end 214 such that the keyway 228 is inside the inner tube as shown in FIGS. 8 and 9.

An L-shaped baffle 230 is mounted in the outer tube 210 to provide water inlet compartment 232 and water outlet compartment 234 as shown in FIGS. 6, 7, 8, and 9. Water at the rate of 15 gallons/minute (0.06 cubic feet/minute) is moved through inlet pipe 236 to travel around the inner tube toward closed end 213 of the outer tube. The water passes around the block 220 and through the compartment 234 toward the end 216 and out of the compartment 234 by way of outlet pipe 238.

The water cooled support arm is advantageously mounted on the water cooled barrel 68 of the attenuating apparatus 60 with the phototransistor 185 spaced 2 inches (5 centimeters) from the adjacent surface of the attenuating wheel 62.

Referring specifically to FIG. 7, the nip sensing head 175 is mounted in the keyway 226 of the block 200 by providing a bificated member 242 mounted at one end of a hollow rod 240. The bificated member is provided with 11 discrete spring fingers 243 which are electrically insulated from one another. Associated with each of the spring fingers is an insulated wire 244 which has one end electrically connected to a spring finger and passes through the rod 240 with the other end of the wire extending beyond the end of the rod as shown in FIGS. 7 and 8.

The rod 240 is made of steel and is 123 inches (3.1 meters) in length. The end 192 of the printed circuit board is inserted in the bificated member 242 to move ones of the tabs 190 and 194–203 into contact with ones of the spring fingers 243.

The sensing head 175 and spacer blocks 223 and 225 are inserted into the open end of the inner tube 214 of the support arm and positioned in the keyway 226 of the block 220 with the phototransistors aligned with the passageways 222 as shown in FIGS. 7, 8 and 10. The end 215 of the inner tube 212 is sealed as by a plate 246 with the rod extending beyond the plate 246. Nitrogen at the rate of 50 standard cubic feet per hour is moved through a tube 248 through the inner tube and out of the passageways 222 of the block 200 to keep the passageway free of dirt and to keep condensation from forming on the phototransistors.

Referring now to FIG. 11, the wires 244 are connected to a circuit 260. The collector end 188 of each of the phototransistors 176–185 is electrically connected to a 5 volt dc voltage supply 262. The emitter end 193 of each of the phototransistors 176–185 is electrically connected to a potentiometer 264 to adjust the output voltage of each of the phototransistors so that the output voltages of each of the phototransistors is approximately 3 volts when the phototransistors are over glass and approximately 1½ volts when the phototransistors are over tin. The potentiometers 264 are connected to ground and to a temperature compensating trimmer 266 which maintains the output voltage of the phototransistors constant for different temperatures of the glass and tin.

The emitter end 193 of each of the phototransistors 176–185 are electrically connected to a comparator circuit 268–277 which amplifies and compares the voltage input signal such that the output signal from the circuits 268–277 is 0 volts when an associated transistor is over glass and 5 volts when over tin.

Lamps 278 are electrically connected at one end to circuits 268–277, respectively, and at their other end to the voltage supply 262. As previously mentioned, the nip sensor is positioned over the top surface of the glass so that the phototransistors are conducting. When a phototransistor is conducting, the lamp associated therewith is lit.

Inverter circuits 298–307 are electrically connected to comparator circuits 268–277, respectively. The inverter circuits 298–307 change the input signal from the comparator. For example, when the input signal is 5 volts, the output signal from each of the inverter circuits is 0 volts and when the input signal is 0 volts, the output signal is 5 volts. The inverter circuits 298–307 are electrically connected to a digital-to-analog circuit 308 which divides the voltage signal from each inverter circuit by 10 e.g., a 5 volt input to the circuit 308 has a 0.5 volt output and (2) sums the input voltage. A strip chart 310 is electrically connected to the circuit 308 to show voltage output of the circuit 308.

In our example, the nip width will be maintained at a maximum of 6 inches (15 centimeters) and a minimum of 4 inches (10 centimeters). As was previously mentioned, the phototransistor 185 is spaced 2 inches (5 centimeters) from the attenuating wheel 62 which is a nip width of 2 inches (5 centimeters) and the phototransistors are spaced ½ inch (1.27 centimeters) from each other.

To provide a 6 inch (15 centimeters) nip width as the maximum range, a drive-out circuit 293 is electrically connected to comparator circuits 268, 269, 271 and 272 which are electrically connected to phototransistors 176, 177, 179 and 180. When either one of phototransistors 176 and 177 are conducting, the drive-out circuit 293 actuates the relay 292 to connect the motor 130 to power supply 291 to rotate the shaft 132 (see FIG. 4) in a second direction to move the carriage and barrel away from the forming chamber, i.e., move the attenuating wheel toward the adjacent sidewall to decrease the nip width. The barrel moves out of the forming chamber until both the phototransistors 179 and 180 are over tin, at which time the circuit 293 de-energizes the relay 292 to de-energize the motor 130.

A drive-in circuit 294 is electrically connected to inverter circuits 306, 302 and 301 which are connected to phototransistors 184, 180 and 179. When the phototransistor 184 is not conducting, the drive-in circuit 294 energizes the relay 292 to connect the motor 130 to the power supply 291 to rotate the shaft 132 (see FIG. 4) in a first direction to move the carriage and barrel toward the forming chamber, i.e., move the attenuating wheel away from the adjacent sidewall to increase the nip width. The barrel moves into the forming chamber until either phototransistors 179 and 180 are over glass, at which time the circuit 294 de-energizes the relay 292 to de-energize the motor 130.

A buzzer 290 and blinking lite 288 are each electrically connected to the power supply 262. The lite 288 provides a visual signal that the nip width is below the minimum nip width. The buzzer 290 audibly signals that the nip width is approaching the minimum width and continued nip width decreases which could cause disengagement between the wheel 62 and ribbon. If this occurs, the ribbon could be pulled to the other side of the opposed attenuating apparatus.

The discussion will now be directed to a linear movement monitoring device 138 for determining (1) the nip width and for centering the ribbon in the bath.

Referring to FIGS. 3 and 4, the detector 138 is mounted to the base 122 by a plate 142. The position detector 138 includes a potentiometer 144 having a spring biased wheel 148 secured to the shaft of the potentiometer. The wheel 148 and potentiometer are advantageously mounted to standard 142 of the base 122. A cable 150 has one end secured to the carriage 82, is wound around the wheel 148 and has the other end secured to the wheel. As the carriage 82 moves toward the sidewall of the forming chamber, the cable is pulled from the wheel against the spring biased action. As the wheel 148 rotates, the voltage output of the potentiometer varies, e.g., increases. As the carriage 82 moves away from the sidewall of the forming chamber, the cable 150 is wound on the wheel 148 by the spring biased action and decreases the voltage output of the potentiometer. For each linear inch (2.54 centimeters) of movement of the carriage, the output voltage of the potentiometer changes 0.01 volt.

The discussion will now be directed to a system for maintaining the width of the ribbon between adjacent bays within a predetermined range. The control of the ribbon width is performed by changing the angle of attenuation. As can be appreciated by those skilled in the art, other parameters may be controlled to change the ribbon width, for example, changing the rate of glass delivery into the forming chamber. However, for purposes of the invention, all parameters are constant and the ribbon width is varied by changing the angle of attenuation.

Referring to FIGS. 2 and 5, a motor 160 is mounted on the underside of the base 122. The motor is connected to a shaft 162 with the shaft 162 connected to a threaded shaft 163 by way of universal 164. The shaft 163 is to be threaded in nut 165. The nut 165 is advantageously pivotally mounted in a yoke with the yoke freely mounted in a base 166 for rotational movement. The base 166 is mounted to the floor adjacent the bay. Rotating the shafts in a first direction makes the angle of attenuation more positive and rotating the shaft in a second opposite direction makes the angle of attenuation less positive.

Mounted on the underside of the base adjacent the motor 160 is an angular movement monitoring device 169 similar to the linear movement monitoring device 138. The device 169 has a potentiometer 171 and a spring biased wheel 173 on the stem of the potentiometer. A cable 174 has its end mounted to the base and the other end mounted to the wheel. For each degree of movement of the base 122 on wheels 153 along the angular path, as shown in FIG. 1, the voltage signal of the potentiometer 171 changes 0.1 volt.

The attenuating apparatus is positioned adjacent a bay, e.g., bay 36, at the right side of the forming chamber 20 as viewed in FIG. 2 with the barrel extended into the forming chamber. A fiberous refractory cloth (not shown) of the type used in the art is thereafter placed in the bay about the barrel to provide for movement of the barrel while preventing the reducing atmosphere in the forming chamber from escaping.

The attenuating apparatus is pivotally mounted at the bay by moving tongue 154 into hitch 156 provided at the sidewall of the forming chamber and inserting pin 158 through the hitch and tongue. The shaft 163 is threaded into the nut 165.

The motor 130 is energized to move the threaded shaft 132 in the first direction to position the phototransistors over the glass. The air cylinder urges out the piston 108 to move the attenuating wheel about 1 inch from the top surface of the body of hot glass.

With all the phototransistors over glass, the voltage trimmer 266 and load resistors 264 are adjusted such that each of the phototransistors has a 3.0 volt output.

The procedure is repeated for positioning an attenuating apparatus at bay 36 on the left side of the forming chamber as viewed in FIG. 2 and for positioning an apparatus at opposed bays 35, 34, 33 and 32.

The voltage supply 291 is thereafter connected to relay 292 (see FIG. 11) and the nip sensor operates to move the barrel, as previously discussed, to maintain the nip width in the predetermined range.

The angle of attenuation, attenuation wheel speed and ribbon width for the glass ribbon moving through the forming chamber are as shown in Table I.

TABLE I

| Attenuation Apparatus Location from FIG. 1 | Angle of Attenuation | Attenuation Wheel Speed Inches Per Minute (Meters Per Inch) | Ribbon Width Inches (Meters) |
| --- | --- | --- | --- |
| Bays 36 | 2° | 89 (2.3) | 214 (5.4) |
| Bays 35 | 5° | 124 (3.2) | 209¾ (5.2) |
| Bays 34 | 7½° | 144 (3.7) | 196¼ (4.9) |
| Bays 33 | 7½° | 240 (6.0) | 167½ (4.3) |
| Bays 32 | 10° | 315 (8.1) | 151¾ (3.8) |

The average thickness of the ribbon at the exit lip of the forming chamber is 0.1053 inch (0.25 centimeter) and a width of 127.75 inches (3.1 meters) at a lehr speed of 430.5 inches per minute (10.8 meters per minute). The temperature of the glass at Bay 36 is 1533° Fahrenheit (830° Centigrade) and at Bay 32, 1470° Fahrenheit (800° Centigrade).

Referring to FIG. 3, the threaded shaft 94 of each attenuating apparatus is rotated to position the attenuating wheel on the glass.

With reference to FIG. 13, (1) the potentiometers 144L and 144R of the linear movement monitoring device; (2) the potentiometer 171L and 171R of the angular movement monitoring device; and (3) the digital-to-analog circuit 308L and 308R of the attenuating apparatus associated with the attenuating apparatus at Bays 32, 33, 34, 35 and 36 are connected to a computer 320. The computer 320 is electrically connected to (1) relays 314L and 314R which operate on motors 160L and 160R, respectively, and (2) relays 316L and 316R which operate on motor 130L and 130R, respectively, associated with the apparatus at the bays 32, 33, 34, 35 and 36.

The computer 320 is programmed to (1) maintain the center of the ribbon in the center of the forming chamber; (2) maintain the ribbon width at the bays as shown in Table I; and (3) operate with the apparatus at Bay 36 as the reference apparatus for angle of attenuation adjustment.

The ribbon is centered by maintaining an equality between Equation 5 and Equation 6 as shown below in Equation 7.

$$\frac{1}{2} FCW - P_{144L} + C_{308L} = \frac{1}{2} FCW - P_{144R} + C_{308R} \qquad 7$$

If the right side of the equation is not equal to the left side, the ribbon is off center and is centered in the following manner. When the left side of the equals sign is greater than the right side, a signal is forwarded to (1) relay 314L to energize the motor 160L to move the attenuating apparatus to a less positive angle and (2) relay 314R to energize the motor 160R to move the attenuating apparatus to a more positive angle. The change in the angle is determined using Equation 3. The angular motion of the attenuating apparatus moves at the same angular speed. As the attenuating apparatuses are moved, the output of the potentiometers 144L and 144R and 308L and 308R are monitored by the computer 320. When the left side of the equals sign has the same value as the right side, the relays 314L and 314R are de-energized to de-energize the motors 160L and 160R, respectively.

If the right side of the equals sign in Equation 7 is greater than the left side, the motors 160L and 160R operate to move their respective attenuating apparatus in an opposite direction.

The ribbon width is maintained at the predetermined width of the bays as shown in Table I using Equations 1, 2, 3, and 4, which were previously discussed and are presented once again for ease of discussion.

$$ARW = FCW - (P_{144L} + P_{144R}) + (C_{308L} + C_{308R}) \qquad 1$$

$$RWE = PRW - ARW \qquad 2$$

$$ADE = \arcsin(RWE/K) \qquad 3$$

$$NAS = ADE + AAS \qquad 4$$

where PRW is 214 inches (5.4 meters) at bays 36; 209¾ inches (5.2 meters) at bays 35; 196¼ inches (4.9 meters) at bays 34; 167½ inches (4.3 meters) at bays 33 and 151¾ inches (3.8 meters) at bays 32 in accordance to Table I. The value of K for the following discussion is 230. The computer is programmed to make only incremental changes of 4 inches (10 centimeters) to the ribbon width, i.e., a maximum allowable ribbon width error change of 4 inches (10 centimeters).

The actual ribbon width (ARW) and ribbon width error (RWE) at bays 32 is determined from Equations 1 and 2, respectively. If the ribbon width error (RWE) is less than 4 inches (10 centimeters), the angular displacement error (ADE) and the new angular settings are determined from Equations 3 and 4, respectively. The computer 320 energizes relays 314L and 314R for bays 32 to move the attenuating apparatus along the angular path until the new angular setting (NAS) is attained as indicated by the potentiometers 171R and 171L of the angular movement monitoring devices 169R and 169L, respectively. The computer then de-energizes the relays 314L and 314R to de-energize the motors 160R and 160L, respectively.

If the value of ribbon width error (RWE) sequentially calculated for the remaining bays 33–36 is less than 4 inches (10 centimeters) then the new angular setting (NAS) is sequentially determined for those bays using Equations 3 and 4. The attenuating apparatuses at bays 33–36 are moved along the angular path in a similar manner as the apparatuses at bays 32 were moved along the angular path.

When the value of the ribbon width error calculated for bays 32 is greater than 4 inches (10 centimeters) the following occurs. It is assumed for sake of discussion that the actual ribbon width (ARW) at bays 32 is 146 inches (3.7 meters). The ribbon width error (RWE) using Equation 2 is determined to be 5¾ inches (14.6 centimeters) which is greater than the maximum allowable ribbon width error change of 4 inches (10 centimeters). Therefore the value of the ribbon width error (RWE) in Equation 3 is 4 inches (10 centimeters) to determine the angular displacement error (ADE). The new angular setting (NAS) is determined using Equation 4 and the apparatuses 60 at bays 32 are moved to the new angular setting as previously discussed.

The new predetermined ribbon width at bays 32 is 150 inches (3.8 meters) which is the actual ribbon width of 146 inches (3.7 meters) plus the maximum allowable silica width change of 4 inches (10 centimeters). The computer 320 changes the predetermined ribbon width error at bays 33–36 to reflect that a new predetermined ribbon width value has been determined for bays 32. More particularly and with reference to Table I, the difference between the predetermined width at bays 32 and 33 is 15¾ inches (40 centimeters). The differences of 15¾ inches (40 centimeters) is added to the new predetermined width at bays 32, i.e., 150 inches (3.8 meters) to give a new predetermined width value of 165¾ inches (4.2 meters).

The new predetermined ribbon width values for bays 34 is 194½ inches (4.8 meters) which is the difference between the predetermined width values for bays 33 and 34, i.e., 28¾ inches (0.7 meters) from Table I, plus the new predetermined ribbon width value for bay 33, i.e., 165¾ inches (42 meters).

The new predetermined ribbon width value for bays 35 is 208 inches (5.1 meters) which is the difference between the predetermined ribbon width values for bays 34 and 35, i.e., 13½ inches (0.3 meter) from Table I, plus the new predetermined ribbon width value for bay 34, i.e., 194½ inches (4.8 meters).

The new predetermined ribbon width value for bays 36 is 212¼ inches (5.2 meters) which is the difference between the predetermined ribbon width value for bays 35 and 36, i.e., 4¼ inches (0.1 meter) from Table I, plus the new predetermined ribbon width value for bays 35, i.e., 208 inches (5.1 meters).

The computer 320 determines the ribbon width error (RWE) for bays 33 using the new predetermined ribbon width value in Equation 2. If the ribbon width error (RWE) is less than the maximum allowable ribbon width change, i.e., 4 inches (10 centimeters), the new angular setting is determined using Equations 3 and 4. The apparatuses at bays 33 are set to the new angular setting as previously discussed.

If the ribbon width error is greater than 4 inches (10 centimeters) e.g., 5 inches (12.7 centimeters) the following occurs. The angular displacement error (ADE) for bays 33 is determined using 4 inches (10 centimeters) as the ribbon width error value (RWE) in Equation 3. Thereafter the new angular setting (NAS) is determined using Equation 4 and the apparatuses at bays 33 are set at the new angular setting as previously discussed. The new predetermined ribbon width at bays 33 is 164¾ inches (4.0 meters), i.e., an actual ribbon width of 160¾ inches (3.9 meters) plus a maximum allowable ribbon change of 4 inches (10 centimeters).

The new predetermined ribbon width value for bays 34 is computed to be 193½ inches (4.7 meters) which is the ribbon width difference between bays 33 and 34, i.e., 28¾ inches (0.7 meter) from Table I plus the new predetermined ribbon width at bays 33, i.e., 164¾ inches (4.0 meters).

The new predetermined ribbon width value for bays 35 is computed to be 207 inches (5.0 meters) which is the ribbon width difference between bays 34 and 35, i.e., 13½ inches (0.3 meter) from Table I, plus the new predetermined ribbon width for bays 34, i.e., 193½ inches (4.7 meters).

The new predetermined ribbon width value for bays 36 is computed to be 211½ inches (5.1 meters) which is the ribbon width difference between bays 35 and 36, i.e., 4½ inches (0.1 meter) from Table I, plus the new predetermined ribbon width value for bays 35, i.e., 207 inches (5.0 meters).

The above is sequentially repeated for bays 34–36.

As can be appreciated, the above was merely presented for illustration purposes only and the values are not limiting to the invention.

The computer 320 in addition to adjusting the angle of attenuation continuously operates to center the ribbon in the forming chamber. Further the circuit 260 in FIG. 11 controls the nip width as previously discussed.

Although the invention was discussed using floor mounted attenuating apparatuses, it can now be appreciated by those skilled in the art that the invention may be practiced on attenuating apparatuses supported from overhead, from the sides or attached to the walls of the forming chamber.

I claim:

1. A device used in combination with an attenuating apparatus for maintaining nip width of a glass ribbon in a predetermined range, the glass ribbon to be moved along a glass ribbon movement path on a pool of supporting molten metal wherein the attenuating apparatus is of the type comprising means for applying translational and longitudinal forces to the glass ribbon, the applying means comprising means for engaging the upper surface of the glass ribbon; means mounting the applying means for moving the applying means along a first reciprocating path generally transverse to the glass ribbon movement path, comprising:

means for sensing the incremental displacement of the edge of the glass ribbon along a second reciprocating path generally parallel to the first reciprocating path;

means for mounting said sensing means in spaced relation to the engaging means and over the surface of the supporting molten metal and the upper surface of the glass ribbon; and means responsive to said sensing means and acting on the moving means for moving the applying means in a first direction to increase the nip width when the nip width as indicated by said sensing means is at least equal to or below the minimum nip width of the predetermined range and for moving the applying means in a second direction opposite to the first direction to decrease the nip width when the nip width as indicated by said sensing means is at least equal to or greater than the maximum nip width of the predetermined range.

2. The device as set forth in claim 1 wherein said sensing means includes:

a plurality of phototransistors.

3. The device as set forth in claim 1 wherein said means for mounting said sensing means includes:

a water cooled support arm;

means for securing said sensing means in said support arm; and passageway means in said support arm for providing a field of view for said sensing means.

4. The device as set forth in claim 3 wherein said sensing means includes a plurality of phototransistors and further including:

means for maintaining said passageways and sensing surface of each of the phototransistors clean.

5. A linear movement monitoring device used in combination with an attenuating apparatus of the type comprising means for applying translational and longitudinal forces to a glass ribbon moving along a glass ribbon movement path on a pool of supporting molten metal; means mounting the applying means for moving the applying means along a reciprocating path generally transverse to the glass ribbon movement path, comprising:

means responsive to the movement of the moving means for generating a signal during movement of the moving means along the reciprocating path; and means responsive to said generating means for converting the signal from said signaling means to linear dimensions to determine distance and direction of movement of the moving means along the reciprocating path.

6. The device as set forth in claim 5 wherein said generating means includes:

a potentiometer having a stem;

a spring biased wheel mounted on the stem of said potentiometer; and a cable having one end connected to the moving means and the other end connected to said spring biased wheel wherein movement of the moving means in a first direction along the reciprocating path (1) uncoils said cable from said spring biased wheel against the biasing action of said wheel and (2) rotates the stem of the potentiometer to vary the voltage output signal of said potentiometer in a first direction and movement of the moving means in a second direction opposite to the first direction rotates said wheel by the biasing action of said wheel to (1) coil said cable on said wheel and (2) vary the output voltage signal of said potentiometer in a second direction.

7. An angular movement monitoring device used in combination with an attenuating apparatus of the type comprising a base pivotally mounted for movement along a reciprocating arcuate path; means mounting the base for applying translational and longitudinal forces to a glass ribbon moving along a glass ribbon path on a pool of supporting molten metal; and means mounting the base for moving the base along the arcuate path, comprising:

means responsive to the movement of the base along the arcuate path for generating a signal during movement of the base along the arcuate path; and means responsive to said generating means for converting the signal from said generating means to degrees to determine distance and direction of movement of the base along the reciprocating arcuate path.

8. The device as set forth in claim 7 wherein said generating means includes:

a potentiometer having a stem;

a spring biased wheel mounted on the stem of said potentiometer;

a plate mounted relative to the arcuate path; and a cable having one end connected to said plate and the other end connected to said spring biased wheel wherein movement of the base in a first direction along the reciprocating arcuate path (1) uncoils said cable from said spring biased wheel against the biasing action of said wheel and (2) rotates the stem of the potentiometer to vary the voltage output signal of said potentiometer in a first direction and movement of the base in a second direction opposite to the first direction rotates said wheel by the biasing action of said wheel to (1) coil said cable on said wheel and (2) vary the output voltage signal of said potentiometer in a second direction.

9. An improved apparatus for attenuating a glass ribbon to be moved along a glass ribbon movement path on a pool of supporting molten metal wherein the attenuating apparatus is of the type comprising means for applying translational and longitudinal forces to the ribbon, the applying means including means for engaging the upper surface of the ribbon; a base pivotally mounted for movement along a reciprocating arcuate movement path relative to the glass ribbon movement path; means for moving the applying means along a first reciprocating path generally transverse to the glass ribbon movement path, and means for moving the base along the arcuate movement path, the improvement comprising:

means for sensing the incremental displacement of the edge of the glass ribbon along a second reciprocating path generally parallel to the first reciprocating path;

means for mounting said sensing means in spaced relation to the engaging means and over the surface of the supporting molten metal and upper surface of the glass ribbon;

means responsive to said sensing means and acting on the moving means for moving the applying means in a first direction to increase nip width of the glass ribbon when the nip width as indicated by said sensing means is at least equal to or below minimum nip width of a predetermined range and for moving the applying means in a second direction opposite to the first direction to decrease the nip width when the nip width as indicated by said sensing means is at least equal to or greater than maximum nip width of the predetermined range;

first means responsive to the movement of the means for moving the applying means for generating a signal during movement of the moving means along the first reciprocating path;

first means responsive to said first generating means for converting the signal from said signaling means to linear dimensions to determine distance and direction of movement of the moving means along the reciprocating path;

second means responsive to the movement of the base along the arcuate path for generating a signal during movement of the base along the arcuate path; and second means responsive to said second generating means for converting the signal from said generating means to degrees to determine distance and direction of movement of the base along the reciprocating arcuate path.

10. The improved attenuating apparatus as set forth in claim 9 further including:

means responsive to said second converting means for energizing the means for moving the base to position the base at a selected location along the arcuate path.

11. The improved attenuating apparatus as set forth in claim 9 wherein said sensing means includes:

a plurality of phototransistors.

12. The improved attenuating apparatus as set forth in claim 9 wherein said means for mounting said sensing means includes:

a water cooled support arm;

means for securing said sensing means in said support arm; and passageway means in said support arm for providing a field of view for said sensing means.

13. The improved attenuating apparatus as set forth in claim 12 wherein said sensing means includes a plurality of phototransistors and further including:

means for maintaining said passageways and sensing surface of each of the phototransistors clean.

14. The improved attenuating apparatus as set forth in claim 9 wherein said first generating means includes:

a potentiometer having a stem;

a spring biased wheel mounted on the stem of said potentiometer; and a cable having one end connected to the means for moving the applying means and the other end connected to said spring biased wheel wherein movement of the means for moving the applying means in a first direction along the reciprocating path (1) uncoils said cable from said spring biased wheel against the biasing action of said wheel and (2) rotates the stem to vary the voltage output signal of said potentiometer of the potentiometer in a first direction and movement of the means moving the applying means in a second direction opposite to the first direction rotates said wheel by the biasing action of said wheel to (1) coil on said wheel and (2) varies the output voltage signal of said potentiometer in a second direction.

15. The improved attenuating apparatus as set forth in claim 9 wherein said second signaling means includes:

a potentiometer having a stem;

a spring biased wheel mounted on the stem of said potentiometer;

a plate mounted relative to the arcuate path; and a cable having one end connected to said plate and the other end connected to said spring biased wheel wherein movement of the base in a first direction along the reciprocating arcuate path (1) uncoils said cable from said spring biased wheel against the biasing action of said wheel and (2) rotates the stem of the potentiometer to vary the voltage output signal of said potentiometer in a first direction and movement of the base in a second direction opposite to the first direction rotates said wheel by the biasing action of said wheel to (1) coil said cable on said wheel and (2) varies the output voltage signal of said potentiometer in a second direction.

16. In a method of manufacturing flat glass comprising the steps of providing molten glass on a pool of supporting molten metal, flowing the molten glass downstream along a ribbon movement path on the pool of molten metal, applying attenuating forces upon the glass ribbon while cooling the glass ribbon to form a dimensionally stable ribbon wherein the attenuating forces are applied by attenuating means adjacent the edges of the glass ribbon at an angle to the normal of the glass movement path and the attenuating means are moveable along a reciprocating path generally transverse to the ribbon movement path; and removing the dimensionally stable glass ribbon from the supporting molten metal, the improvement comprising the steps of:
  measuring the distance between the edge of the ribbon and the position on the ribbon where the attenuating forces are applied to determine nip width; and
  moving the attenuating means in response to the measured distance (1) in a first direction along the reciprocating path to decrease the nip width when the nip width is greater than a predetermined amount and (2) in a second direction along the reciprocating path opposite to the first direction to increase the nip width when the nip width is less than a predetermined amount.

17. The improved method as set forth in claim 16 wherein said measuring step is accomplished by:
  positioning a plurality of phototransistors in a plane generally transverse to the movement path of the glass and extending over the supporting molten metal and upper surface of the glass ribbon wherein ones of the phototransistors over glass generate a first signal and ones of the phototransistors over the supporting molten metal generate a second signal.

18. In a method of manufacturing a flat glass ribbon including the steps of containing a pool of supporting molten metal in a container having sidewalls spaced a known distance apart; providing molten glass on the pool of supporting molten metal; flowing the molten glass downstream along a ribbon movement path on the pool of supporting molten metal; applying attenuating forces upon the glass ribbon while cooling the glass ribbon to form a dimensionally stable glass ribbon wherein the attenuating forces are applied by rotary attenuating means adjacent the edges of the glass ribbon at an angle to the normal of the glass movement path, said attenuating means having an elongated axis which is pivoted about a vertical axis, said elongated axis being transverse to the glass movement path, and the attenuating means are reciprocably movable along an arcuate linear path; and removing the dimensionally stable ribbon from the pool of supporting molten metal, the improvement comprising the steps of:
  measuring the width of the ribbon at positions where the attenuating forces are applied;
  measuring the angle subtended by the elongated axis of the attenuating means and the ribbon path to determine the angle of attenuation;
  determining the incremental changes of the angle of attenuation required to provide a desired predetermined ribbon width; and
  moving the attenuating means along the arcuate linear path to change the angle of attenuation in an amount sufficient to provide the desired predetermined ribbon width at the positions on the ribbon where the attenuating forces are applied.

19. The improved method as set forth in claim 18 wherein a plurality of a pair of attenuating means are positioned at discrete locations along the glass ribbon path and said improvement steps are performed on each of the attenuating means at each of the discrete locations.

20. The improved method as set forth in claim 18 further including the step of:
  measuring the distance of each of the attenuating means to the adjacent edge of the glass ribbon to determine nip width;
  moving the attenuating means in a first direction along its reciprocating path to decrease the nip width when the measured nip width is greater than a predetermined amount and in a second direction along the reciprocating path opposite to the first direction to increase the nip width when the measured nip width is less than the predetermined amount.

21. The improved method as set forth in claim 18 wherein a plurality of a pair of attenuating means are provided along the ribbon path wherein a selected one pair of the plurality of pairs of attenuating means is a referenced pair and said measuring steps are performed at each of the discrete locations, further including the step of:
  comparing the width at the reference pair of attenuating means to the desired predetermined width to determine the difference therebetween;
  comparing the determined difference to a maximum allowable change in ribbon width wherein the maximum allowable change is made when the determined difference exceeds the maximum allowable change and the determined width change is made when the determined difference is less than the maximum allowable change; and
  practicing said moving step on the referenced pair of attenuating means.

22. The improved method as set forth in claim 21 further including the step of:
  changing the desired predetermined width for selected ones of the discrete locations when the width for the referenced pair of attenuating means exceeds the maximum allowable change to provide a gradual attenuation of the glass ribbon.

23. The improved method as set forth in claim 21 wherein the referenced pair of attenuating means is the pair farthest upstream from the position where the removing step is practiced.

24. The improved method as set forth in claim 21 further including the step of:
  sequentially repeating the above said steps for the attenuating means at each of the discrete locations.

25. The improved method as set forth in claim 24 wherein the desired predetermined width for the attenuating means at a discrete location is changed when the width for an adjacent upstream location exceeds the desired width for that location.

26. The method according to claim 16 wherein the attenuating means are reciprocably moved along a straight linear path generally transverse to the ribbon path movement.

27. The method of claim 16 wherein the attenuating means are reciprocably moved along an arcuate linear path generally transverse to the ribbon movement path.

* * * * *